United States Patent Office 3,162,631
Patented Dec. 22, 1964

3,162,631
16β - HYDROXY - 21 - CARBOXYLIC ACID γ - LACTONES OF THE PREGNANE SERIES AND PROCESS FOR THE PREPARATION THEREOF
John E. Pike, Kalamazoo, Mich., assignor to The Upjohn Company, Kalamazoo, Mich., a corporation of Delaware
No Drawing. Filed May 16, 1962, Ser. No. 195,339
40 Claims. (Cl. 260—239.57)

This invention relates to novel steroid 16β-hydroxy-21-carboxylic acid γ-lactones of the pregnane series having in ring D the structure

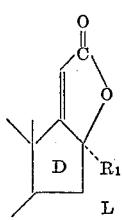

wherein $R_1$ is selected from the group consisting of hydrogen and methyl, and novel steroid intermediates and methods used in the preparation thereof.

More particularly, this invention relates to novel steroid 16β-hydroxy-21-carboxylic acid γ-lactones represented by the following formulae:

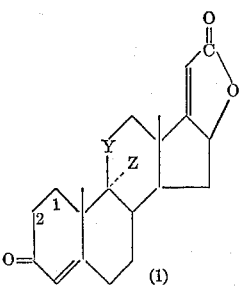

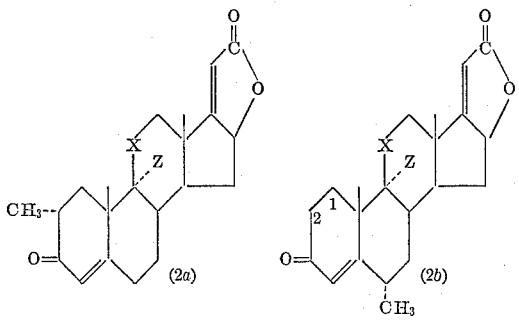

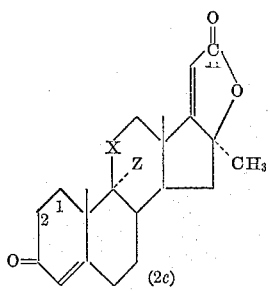

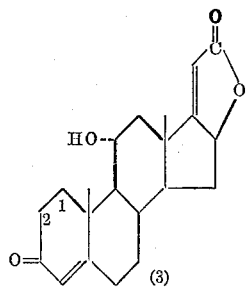

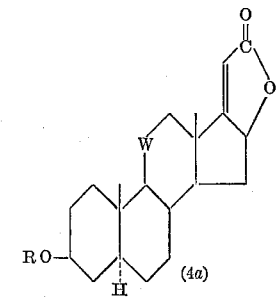 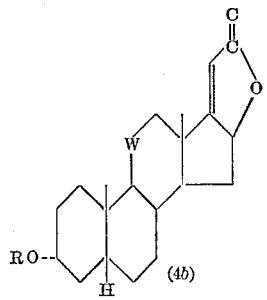

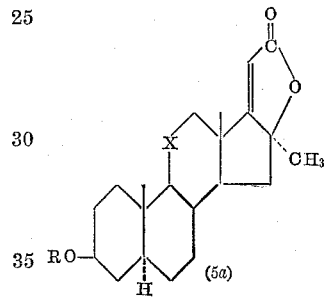 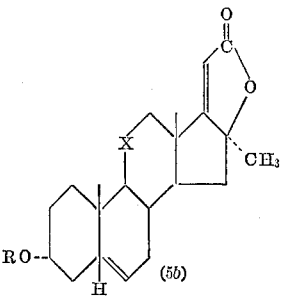

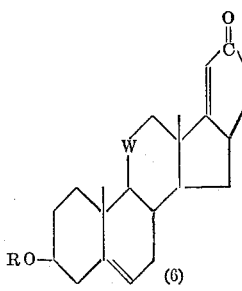

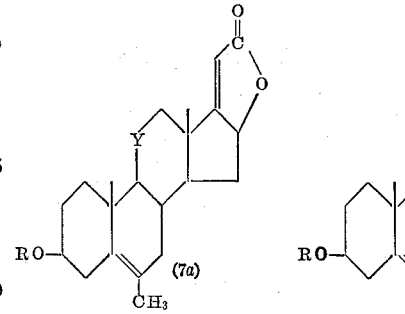

wherein the 1,2-carbon atom linkage is selected from the group consisting of single and double bond linkages, R is selected from the group consisting of hydrogen and the acyl radical of a hydrocarbon carboxylic acid containing from 1 to 12 carbon atoms, inclusive, W is selected from the group consisting of methylene ($>CH_2$), β-hydroxymethylene

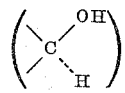

carbonyl (>C=O), α-hydroxymethylene

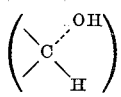

and α-acyloxymethylene

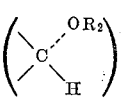

$R_2$ being the acyl radical of a hydrocarbon carboxylic acid containing from 1 to 12 carbon atoms, inclusive, and provided that $R_2$ is the same as R when R is an acyl radical X is selected from the group consisting of β-hydroxymethylene

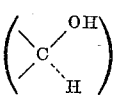

and carbonyl (>C=O), Y is selected from the group consisting of methylene (>CH$_2$), β-hydroxymethylene

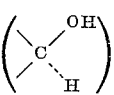

and carbonyl (>C=O), Z is selected from the group consisting of hydrogen and fluorine, X and Z and Y and Z can together constitute a 9(11)-double bond.

The novel compounds of Formula L and more particularly the compounds of Formulas 1, 2a, 2b, 2c, 3, 4a, 4b, 5a, 5b, 6, 7a and 7b possess useful therapeutic properties. Each possesses cardiotonic, anti-inflammatory, salt and water regulating, pituitary inhibiting, anti-anabolic, muscle relaxant, antifertility, cytotoxic, anti-viral, and antimicrobial activities.

The compounds of the formulas depicted above are useful in the treatment of diseases of animals and are particularly useful in the treatment of inflammatory conditions of mammals and birds, such as the treatment of inflammatory conditions of the skin, eyes and ears of valuable domestic animals, as well as contact dermatitis and other allergic reactions.

Additionally, the compounds of the formulas depicted above are useful in treating mental disease states and circulatory diseases in mammals and birds, and more particularly in valuable domestic animals. These compounds have digitalis-like activity in increasing the contractility of the heart muscle, diminishing the heart rate and improving cardiac efficiency. In addition, they possess the advantage of a greater margin of safety relative to digitalis and related drugs.

Administration of the compounds of Formulas L, 1, 2a, 2b, 2c, 3, 4a, 4b, 5a, 5b, 6, 7a and 7b can be in conventional dosage forms, such as pills, tablets, capsules, syrups or elixirs for oral use, or in liquid forms which are suitable for injectable products. They can also be administered topically in the form of ointments, creams, lotions and the like, with or without coacting antibiotics, germicides or other materials forming advantageous combinations therewith.

The compounds of the formulae given above are also useful as ultraviolet screens. When used topically they absorb a portion of the erythema producing ultraviolet bands and at the same time permit the tanning ultraviolet bands to come through and are thus useful ultraviolet screening agents in the tanning of human skin.

The compounds of Formulas L, 1, 2a, 2b, 2c, 3, 4a, 4b, 5a, 5b, 6, 7a and 7b, in non-toxic solutions, are also useful for the irrigation of surgical wounds, particularly following the removal of tumorous tissues to prevent wound seeding.

The novel compounds of Formula L and more particularly the compounds of Formulas 1, 2a, 2b, 2c, 3, 4a, 4b, 5a, 5b, 6, 7a and 7b are produced according to the following reaction scheme:

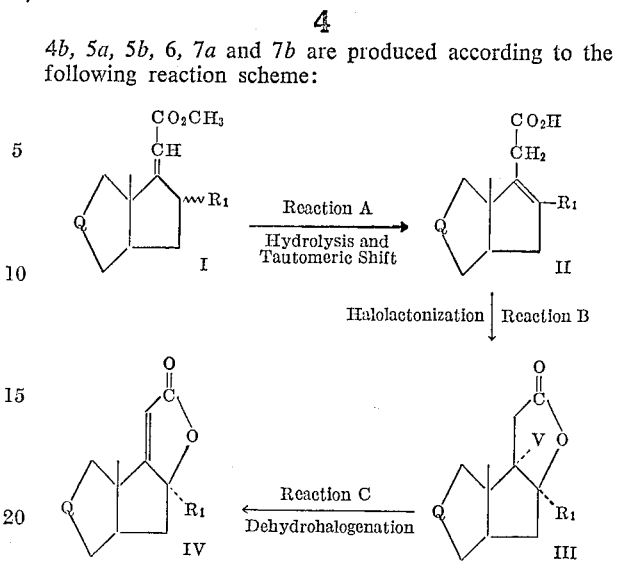

wherein Q is the remainder of the steroid moiety, $R_1$ is selected from the group consisting of hydrogen and methyl and V is selected from the group consisting of iodine, bromine and chlorine.

In this application unless specifically designated as cis or trans, the carbomethoxy group attached to the double bonded C-20 carbon atom of the compounds of Formula I includes both the cis and transconfiguration and/or mixtures thereof. The compounds of Formula I having the cis configuration are the preferred starting materials since they are more readily available than those having the trans configuration.

The wavy line ($\wr$) appearing at the 16-position of Formula I is a generic expression inclusive of the α and β-configurations or mixtures thereof. The configuration at the 16-position of the starting material is immaterial since, as shown by the reaction scheme, the compounds of Formula II can have only one configuration due to the presence of the double bond at the 16-position, and the latter are in turn converted into compounds capable of having only the 16α-configuration as shown by Formulas III and IV.

The process of the present invention comprises treating the Faworskii esters, the compounds of Formula I, such as methyl 3β-hydroxy-11-keto-5α-pregn-17(20)-en-21-oate, with a base to obtain the compounds of Formula II, such as 3β-hydroxy-11-keto-5α-pregn-16(17)-en-21-oic acid. The conversion of the compounds of Formula I to the compounds of Formula II, Reaction A, involves the hydrolysis of the 21-ester group accompanied by a tautomeric shift of the 17(20)-double bond to the 16(17)-position.

The conversion of the compounds of Formula I to the compounds of Formula II is carried out according to procedures well known in the art, such as those disclosed by Hogg et al., J. Amer. Chem. Soc. 77, 4436 (1955). Suitable bases are inorganic bases, for example, alkalimetal hydroxides, e.g., potassium hydroxide, sodium hydroxide, and the like, alkali bicarbonates and carbonates, e.g., potassium bicarbonate, sodium bicarbonate, and the like, and lithium halides in organic solvents, for example, lithium iodide in piperidine, collidine and the like. Advantageously the reaction is carried out in an aqueous medium at temperatures of from −30° C. to 200° C. An inert reaction solvent, e.g., methanol, ethanol, dioxane, tetrahydrofuran, ethylene glycol, diethylene glycol, diglyme, and the like, can also be employed, particularly where the starting steriod is difficultly or moderately soluble in water.

Where the compounds of Formula II are available as starting materials, Reaction A of the process, namely, the hydrolysis of the 21-ester group, accompanied by a tautomeric shift of the 17(20)-double bond to the 16(17)- position, is obviously eliminated as is shown in Example 3.

Reaction A, besides producing the compounds of Formula II, also produces in varying degrees, depending on the starting steriod, compounds represented by the following formula:

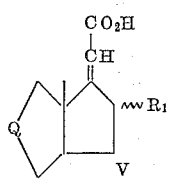

wherein Q and R₁ are defined as above. The 21-free acid compounds of Formula V upon recovery from the reaction mixture, as described below, are reesterified according to procedures well known in the art for the esterification of steroid free acid, such as those disclosed by Reindel and Niederlander, Ber. 68B, 1969–73 (1935), and the reesterified steriod is used as the starting steriod in Reaction A.

The compounds of Formula II and V are recovered following Reaction A by fractional crystallization, chromatography of the total crude alkaline hydrolysis reaction product on acid-washed alumina, Florisil (synthetic magnesium silicate), silica-gel, or silicic acid, eluting with chloroform containing increasing amounts of methanol or hexanes containing increasing amounts of acetone, Craig countercurrent partition separation, column partition chromatography, preparative paper chromatography, of a combination of these.

Alternatively, the entire reaction mixture obtained following Reaction A can be used in the subsequent halolactonization reaction, Reaction B, and the compounds of Formula V can be separated from the halolactone, the compounds of Formula III.

Following recovery of the compounds of Formula V from Reaction B, they can be reesterified and recycled to Reaction A for use as starting materials.

Reaction B, the conversion of the compounds of Formula II, such as 3β-hydroxy-11-keto-5α-pregn-16(17)-en-21-oic acid, to the compounds of Formula III, such as 3β,16β - dihydroxy - 11-keto-17α-iodo-5α-pregnan-21-oic acid γ-lactone, is carried out by reacting the starting steroid of this step of the process (the compounds of Formula II) with iodine. The iodolactonization reaction, Reaction B, is carried out in an alkaline aqueous medium and in the presence of an alkali metal or alkaline earth metal iodide, e.g., sodium or potassium iodide, calcium iodide, and the like, preferably potassium iodide. The alkaline medium is obtained by using relatively water soluble alkali metal carbonates, alkaline earth metal carbonates, alkali metal bicarbonates, alkaline earth bicarbonates, alkali metal hydroxides, alkaline earth hydroxides, e.g., sodium or potassium carbonate, calcium carbonate, sodium or potassium bicarbonate, barium bicarbonate, sodium or potassium hydroxide, calcium hydroxide, and the like, preferably sodium and potassium carbonate.

While the halolactonization reaction, Reaction B, has been described with particularity, using iodine as the halogen, other halogens, bromine or chlorine, can be used to form the corresponding 17α-bromolactones and 17α-chlorolactones embraced by Formula III. When bromine or chlorine are used in the halolactonization step, the corresponding bromide or chloride is substituted for the various iodides given above.

The halolactonization reaction is carried out at temperatures of from about −30° to 50° for about 1 to 24 hours.

The compounds of Formula III, such as 3β,16β-dihydroxy-11-keto-17α-iodo-5α-pregnan-21-oic acid γ - lactone, are recovered from the reaction mixture (Reaction B) using the methods described above for the recovery of the compounds of Formula II from Reaction A.

The compounds of Formula V, if they have not previously been separated from the compounds of Formula II following Reaction A, can be separated from the compounds of Formula III following Reaction B by the methods described above for the separation of the compounds of Formula II from the compounds of Formula V, reesterified and recycled for use as starting materials.

Alternatively, the entire crude product obtained from Reaction B can be used in the subsequent dehydrohalogenation reaction, Reaction C, and the compounds of Formula V separated from the 16β-hydroxy-21-carboxylic acid γ-lactones, the compounds of Formula IV, in the manner described above for the separation of the compounds of Formula V from the compounds of Formula II. The compounds of Formula V separated from Reaction C, can be reesterified and recycled for use as starting materials.

As shown above, the compounds of Formula V can be recovered following steps A or B of the reaction scheme, or carried through the last step, Reaction C, reesterified and recycled as starting materials. Generally, it is preferred to separate the compounds of Formula V at the earliest time possible, namely, following Reaction A.

The compounds of Formula III, such as 3β,16β-dihydroxy-11-keto-17α-iodo-5α-pregnan-21-oic acid γ - lactone, are then dehydroiodinated (Reaction C) to give 3β,16β-dihydroxy-11-keto-5α-pregn-17(20)-en-21-oic acid γ-lactone. The dehydroiodination is carried out by treating the iodolactone with a tertiary amine, e.g., pyridine, trimethylamine, triethylamine, collidine lutidine or by other methods known in the art to effect dehydrohalogenation, e.g., with lithium halides in dimethylformamide, diethylformamide and the like or with trimethyl phosphite or triethyl phosphite and the like. In the preferred method, the dehydroiodination is effected with pyridine, followed by separation of the product, for example, 3β,16β-dihydroxy-11-keto-5α-pregn-17(20)-en-21-oic acid γ-lactone, using the known methods described above.

The dehydroiodination reaction can be carried out at temperatures ranging from −30° to 200°, with room temperature being preferred, for from 1 to 72 hours.

While the dehydrohalogenation (Reaction C) has been described with particularity using an iodolactone, other halolactones, i.e., chlorolactones and bromolactones, can also be used.

The compounds of Formula IV containing acylatable hydroxyl groups can be acylated according to procedures known in the art, for example, those disclosed in U.S. Patent 2,877,241. Suitable acylating agents are organic carboxylic acids, particularly hydrocarbon carboxylic acids, containing from 1 to 12 carbon atoms, inclusive, or the anhydrides or acid halides thereof, for example, a saturated straight-chain aliphatic acid, e.g., formic, acetic, propionic, butyric, valeric, hexanoic, lauric, a saturated branched-chain aliphatic acid, e.g., trimethylacetic, isobutyric, isovaleric, tertiary butylacetic, a cycloaliphatic saturated acid, e.g., β-cyclopentylpropionic, cyclohexanecarboxylic, cyclohexylacetic, an alkaryl acid, e.g., benzoic, phenylacetic, β-phenylpropionic, o-, m-, p-toluic, a saturated dibasic acid (which can be converted into water-soluble, e.g., sodium, salts), e.g., succinic, adipic, a mono-basic unsaturated acid, e.g., acrylic, crotonic, undecylenic, propiolic, undecolic, cinnamic, dibasic unsaturated acids (which can be converted into water-soluble, e.g., sodium, salts), e.g., maleic and citraconic, or the acid anhydrides and acid halides thereof. The acylation is carried out using the acylating agent as solvent, or in the presence of a suitable inert solvent, such as benzene, xylene, dioxane, methylene chloride or the like, particularly when the acylating agent is a solid, and frequently in the presence of a catalyst, such as p-toluenesulfonic acid, or an amine, preferably pyridine. Completion of the reaction can take from a few minutes to 24 hours, depending on the temperature and the solvent employed.

If the acylating agent is the free acid, the reaction is preferably carried out in the presence of an esterification catalyst, for example, p-toluenesulfonyl chloride, trifluoroacetic anhydride, p-toluenesulfonic acid, trifluoroacetic acid, sulfuric acid, and the like.

Thus, for example, 3β,16β-dihydroxy-11-keto-5α-pregn-17(20)-en-21-oic acid γ-lactone is reacted with acetic anhydride to obtain 3β-acetoxy-16β-hydroxy-11-keto - 5α-pregn-17(20)-en-21-oic acid γ-lactone.

PREPARATION 1

*Methyl 2α-Methyl-3-Keto-11β-Hydroxypregna-4,17(20)-Diene-21-Oate*

To a solution of 8.5 g. (0.025 mole) of 2α-methyl-11β-hydroxyprogesterone in 125 ml. of anhydrous tertiary butyl alcohol there is added, with stirring, 13.6 ml. (0.100 mole) of ethyl oxalate and 20 ml. (0.062 mole) of 3.15 normal solution of sodium methoxide in methanol at about 50° C. The mixture is stirred for 20 hours, with the exclusion of moisture, whereupon a solution of 3.06 g. of sodium acetate and 3.53 ml. of glacial acetic acid in 200 ml. of methanol is added thereto.

The thus-obtained solution is cooled to about 5° C. with an ice bath and a solution of 10.8 g. (0.0675 mole) of bromine in 108 ml. of methanol is added during the next half hour. The amount of bromine to be added is determined by the color of the reaction mixture which progressively lightens during the course of the bromine addition until the solution is colorless. When the bromine color appears to persist, no further bromine is added.

To this solution is added 45 ml. (0.142 mole) of a 3.15 Normal methanolic solution of sodium methoxide, followed by stirring for five hours at room temperature, and then 20 ml. of glacial acetic acid and 2.4 g. of zinc dust is added and the mixture is stirred for about 30 minutes. The resulting reaction mixture is poured into about 1500 ml. of water and the precipitate is separated by filtration, washed, and dried to give a product comprising methyl 2α - methyl-3-keto-11β-hydroxypregna-4,17,(20)-dien-21-oate. The pure ester is obtained by dissolving the thus-obtained product in benzene and chromatographing over a column of Florisil (synthetic magnesium silicate), eluting the column with commercial hexanes containing increasing amounts of acetone. The eluted fractions are freed of solvent and those which by papergram and infrared analysis show the desired product, methyl 2α - methyl - 3 - keto - 11β - hydroxypregna - 4,17(20)-dien-21-oate, are combined and crystallized from, for example, a mixture of ethyl acetate and hexanes.

Similarly, substituting a stoichiometrically equivalent amount of

2α - methyl - 9α - fluoro - 11β - hydroxyprogesterone,
2α - methyl - 9α - fluoro - 11 - ketoprogesterone, and
2α-methyl-4,9(11)-pregnadiene-3,20-dione for
2α - methyl - 11β - hydroxyprogesterone in Preparation 1 above is productive of
methyl 2α - methyl - 3 - keto - 9α - fluoro - 11β - hydroxypregna - 4,17(20) - dien - 21 - oate,
methyl 2α - methyl - 3,11 - diketo - 9α - fluoropregna - 4, 17(20)-dien-21-oate, and
methyl 2α - methyl - 3 - ketopregna - 4,9(11),17(20) - trien-21-oate, respectively.

Similarly, substituting a stoichiometrically equivalent amount of
6α - methylprogesterone,
6α - methyl - 11β - hydroxyprogesterone,
6α - methyl - 11β - hydroxy - 1,4 - pregnadiene - 3,20 - dione,
6α - methyl - 1,4 - pregnadiene - 3,11,20 - trione,
6α - methyl - 9α - fluoro - 11β - hydroxyprogesterone,
6α - methyl - 9α - fluoro - 11β - hydroxy - 1,4 - pregnadiene-3,20-dione,
6α - methyl - 9α - fluoro - 11 - ketoprogesterone,
6α - methyl - 9α - fluoro - 1,4 - pregnadiene - 3,11,20 - trione,
6α - methyl - 4,9(11) - pregnadiene - 3,20 - dione and
6α - methyl - 1,4,9(11) - pregnatriene - 3,20 - dione for
2α - methyl - 11β - hydroxyprogesterone in Preparation 1 above is productive of
methyl 3 - keto - 6α - methylpregna - 4,17(20) - dien - 21 - oate,
methyl 3 - keto - 6α - methyl - 11β - hydroxypregna - 4, 17(20) - dien - 21 - oate,
methyl 3 - keto - 6α - methyl - 11β - hydroxypregna - 1, 4,17(20)-trien-21-oate,
methyl 3,11 - diketo - 6α - methylpregna - 1,4,17(20) - trien-21-oate,
methyl 3 - keto - 6α - methyl - 9α - fluoro - 11β - hydroxypregna-4,17(20)-dien-21-oate,
methyl 3 - keto - 6α - methyl - 9α - fluoro - 11β - hydroxypregna-1,4,17(20)-dien-21-oate,
methyl 3,11 - diketo - 6α - methyl - 9α - fluoropregna - 4, 17(20)-dien-21-oate,
methyl 3,11 - diketo - 6α - methyl - 9α - fluoropregna - 1, 4,17(20)-trien-21-oate,
methyl 3 - keto - 6α - methylpregna - 4,9(11),17(20) - trien-21-oate,
and methyl 3 - keto - 6α - methylpregna - 1,4,9(11), 17 (20)-tetraen-21-oate, respectively.

PREPARATION 2

*Methyl 3β,11α-Dihydroxy-5α-Pregn-17(20)-En-21-Oate*

To a solution of 3.2 g. of 3β,11α-dihydroxy-5α-pregnan-20-one in 50 ml. of tertiary butyl alcohol is added at 60° C. with stirring under a nitrogen atmosphere, 5.6 ml. of ethyl oxalate and 4.76 g. of 28.1 percent by weight sodium methoxide in methanol. The resulting solution is allowed to cool to room temperature and is stirred for 2 hours. Then a solution of 1.44 ml. of acetic acid and 1.66 g. of sodium acetate in 70 ml. of methanol at 10° C. is added over a period of 10 minutes. The resulting solution is cooled to 0° C. and to it is slowly added, over a period of 15 minutes, 3.2 g. of bromine in 48 ml. of cold methanol, followed by 10.7 g. of 28.1 percent by weight sodium methoxide in methanol. After stirring for 1.5 hours while warming to room temperature, 16 ml. of acetic acid and 3 g. of zinc dust is added and stirring is continued for 30 minutes. After filtering, 50 ml. of water is added to the filtrate and the mixture is concentrated at reduced pressure. The product is extracted with methylene chloride which is then washed with water, aqueous sodium bicarbonate, dried and then chromatographed over Florisil (synthetic magnesium silicate) and eluted with commercial hexanes containing increasing amounts of acetone. Those eluate fractions shown by infrared and papergram analysis to contain methyl 3β,11α-dihydroxy-5α-pregn-17(20)-en - 21 - oate are combined and recrystallized from for example, a mixture of acetone and hexanes.

Similarly, substituting a stoichiometrically equivalent amount of
3α - hydroxy - 5β - pregnan - 20 - one,
3α,11β - dihydroxy - 5β - pregnan - 20 - one,
3α - hydroxy - 5β - pregnane - 11,20 - dione, and
3α,11α - dihydroxy - 5β - pregnan - 20 - one
for 3β,11α-dihydroxy-5α-pregnan-20-one in Preparation 2 above is productive of
methyl 3α - hydroxy - 5β - pregn - 17(20) - en - 21 - oate,
methyl 3α,11β - dihydroxy - 5β - pregn - 17(20) - en - 21 - oate,
methyl 3α - hydroxy - 11 - keto - 5β - pregn - 17(20) - en - 21-oate, and
methyl 3α,11α - dihydroxy - 5β - pregn - 17(20) - en - 21 - oate, respectively.

Similarly, substituting a stoichiometrically equivalent amount of methyl 3β-hydroxy-16α-methyl-5α-pregnane-11,20 - dione for 3β,11α-dihydroxy-5α-pregnan-20-one in Preparation 2 above is productive of methyl 3β-hydroxy-11-keto-16α-methyl-5α-pregn-17(20)-en-21-oate.

PREPARATION 3

*Methyl 3β-Hydroxy-16β-Methylpregna-5(6),17(20)-Dien-21-Oate*

To a stirred solution of 55.8 g. (0.15 mole) of 16β-methylpregnenolone acetate in 525 ml. of warm (60° C.) t-butyl alcohol contained in a nitrogen atmosphere was added 84 ml. (4 equivalents) of ethyl oxalate and 71.4 g. of a 28.1 percent w./w. solution of sodium methoxide in methanol (2.5 equivalents of methoxide). The mixture became cloudy but no precipitation occurred. The temperature was allowed to drop to 25–30° C. while stirring for 1 hour. A cold (0° C.) solution of 21.6 ml. of acetic acid and 24.9 g. of anhydrous sodium acetate in 1050 ml. of methanol was then added and the solution further cooled to 0° C. in a cooling bath. With continued cooling a solution of 72 g. (3 equivalents) of bromine in 720 ml. of cold methanol was added over a period of 15 minutes. The solution was then treated rapidly with 190.5 g. of a 28.1 percent w./w. solution of sodium methoxide in methanol (6.6 equivalents of methoxide). The color became orange-red soon fading to amber. The cooling bath was removed, and the solution stirred for 2 hours, 150 ml. of acetic acid and 60 g. of zinc dust were then added and the mixture was stirred for 30 minutes. The mixture was then filtered. The filtrate was evaporated to a thick paste which was partitioned between methylene chloride and water. The organic phase was dried and evaporated to a syrup which was taken up in benzene and chromatographed on 1 kg. of Florisil. The column was eluted with one 1800-ml. portion of benzene, four 1800-ml. portions of 2 percent acetone in commercial hexanes, fifteen 1800-ml. portions of 3 percent acetone in commercial hexanes and 1800 ml. of acetone. Fractions 1–20 upon evaporation gave partly crystalline material and were combined to yield 40.98 g. of a product comprising methyl 3β-hydroxy-16β-methylpregna-5(6),17(20)-dien-21-oate. A portion was rechromatographed on Florisil and the combined product fractions crystallized from dilute methanol to give a product melting at 83–91° C. Repeated recrystallization from methanol yielded methyl 3β-hydroxy-16β-methylpregna-5(6),17(20)-dien-21-oate having a melting point of 151–153° C., $[\alpha]_D -30°$ (CHCl$_3$), $\lambda^{alc.}_{max.}$ 226mμ ($\epsilon = 11,100$)

and the following analysis:

*Analysis.*—Calcd. for C$_{23}$H$_{34}$O$_3$: C, 77.05; H, 9.56. Found: C, 76.67; H, 9.62.

Similarly, substituting a stoichiometrically equivalent amount of 6-methyl-3β-acetoxy-5-pregnen-20-one for 16β-methylpregnenolone acetate in Preparation 3 above is productive of methyl 3β-hydroxy-6-methylpregna-5(6),17(20)-dien-21-oate.

PREPARATION 4

*Methyl 3-Keto-11β-Hydroxy-16α-Methylpregna-4,17(20)-Dien-21-Oate*

(A) A mixture of 1.0 g. of methyl 3,11-diketo-16α-methylpregna-4,17(20)-dien-21-oate, 10 mg. of paratoluenesulfonic acid, 5 ml. of ethylene glycol and 100 ml. of benzene is heated under reflux for 5 hrs. with vigorous stirring. The water formed is removed by codistillation with the benzene. The reaction mixture is cooled and washed with aqueous sodium bicarbonate and then dried. The solvent is distilled leaving a residue of the 3-ethylene ketal of methyl 3,11-diketo-16α-methylpregna-4,17(20)-dien-21-oate.

(B) To a solution of 5 g. of the thus obtained 3-ethylene ketal of methyl 3,11-diketo-16α-methylpregna-4,17(20)-dien-21-oate in 100 ml. of propanol-2 is added 20 ml. of 0.1 N sodium hydroxide and 2 g. of sodium borohydride. The mixture is stirred at 25° C. for about 17 hours and then an additional 50 ml. of propanol-2, 5 ml. of 0.1 N sodium hydroxide and 0.5 g. of sodium borohydride is added and stirring is continued for about an additional 24 hours. The solvent is removed by distillation at reduced pressure and the residue is triturated with water and then recrystallized from, for example, a mixture of acetone and water to give the 3-ethylene ketal of methyl 3-keto-11β-hydroxy-16α-methylpregna-4,17(20)-dien-21-oate.

(C) To a solution of 1.0 g. of the 3-ethylene ketal of methyl 3-keto-11β-hydroxy-16α-methylpregna-4,17(20)-dien-21-oate in 100 ml. of acetone is added sufficient 6 N hydrochloric acid to give an acidic test with pH test paper. The mixture is heated under reflux for about 30 minutes, the solvent removed by distillation under reduced pressure, and the residue extracted with methylene chloride. The methylene chloride solution is washed with water, dried, and chromatographed over Florisil (synthetic magnesium silicate). The column is eluted with portions of commercial hexanes containing increasing amounts of acetone. Those eluate fractions containing methyl 3-keto-11β-hydroxy-16α-methylpregna-4,17(20)-dien-21-oate as shown by infrared and paper chromatography analysis are combined and crystallized, for example, from ethyl acetate, to obtain the pure compound.

Substituting a stoichiometrically equivalent amount of methyl 3β-hydroxy-11-keto-5α-pregn-17(20)-en-21-oate for the 3-ethylene ketal of methyl 3,11-diketo-16α-methylpregna-4,17(20)-dien-21-oate in Part B of Preparation 4 above is productive of methyl 3β,11β-dihydroxy-5α-pregn-17(20)-en-21-oate.

Similarly, substituting as stoichiometrically equivalent amount of methyl 3β-hydroxy-11-keto-16α-methyl-5α-pregn-17(20)-en-21-oate for the 3-ethylene ketal of methyl 3,11-diketo-16α-methylpregna-4,17(20)-dien-21-oate in Part B of Preparation 4 above is productive of methyl 3β,11β-dihydroxy-16-methyl-5α-pregn-17(20)-en-21-oate.

PREPARATION 5

*Methyl 3-Keto-9α-Fluoro-11β-Hydroxypregna-1,4,17(20)-Trien-21-Oate*

Six 100-ml. portions of a medium in 250-ml. Erlenmeyer flasks containing 1 percent glucose, 2 percent corn steep liquor (60 percent solids) and tap water is adjusted to a pH of 4.9. This medium is sterilized for 45 minutes at 15 pounds per square inch pressure and inoculated with a one to two day growth of *Septomyxa affinis* A.T.C.C. 6737. The Erlenmeyer flasks are shaken at room temperature at about 24° C. for a period of 3 days. At the end of this period, this 600-ml. volume is used as an inoculum for 10 liters of the same glucose-corn steep liquor medium which in addition contained 10 ml. of an antifoam (a mixture of lard oil and octadecanol). The fermentor is placed into the water bath, adjusted to 28° C., and the contents stirred (300 r.p.m.) and aerated (0.5 liter air/10 liters beer). After 17 hours of incubation, when a good growth developed and the acidity rose to pH 6.7, 2 g. of methyl 3-keto-9α-fluoro-11β-hydroxy-pregna-4,17(20)-dien-21-oate plus 1 g. of 3-ketobisnor-4-cholen-22-al, dissolved in 115 ml. of dimethylformamide, is added and the incubation (conversion) carried out at the same temperature and aeration for 24 hrs. (final pH 7.9). The myceluim is filtered off and the steroidal material is extracted with methylene chloride, the extracts evaporated to dryness, and the resulting residue chromatographed over a Florisil (synthetic magnesium silicate) column, and eluted with commercial hexanes containing increasing amounts of acetone. The eluate fractions are evaporated and the residues containing methyl 3-keto-9α-fluoro-11β-hydroxy-pregna-1,4,17(20)-trien-21-oate as shown by paper chromatography and infrared absorption are combined and recrystallized, for example, from ethyl acetate-hexane mixture.

Similarly, substituting

Methyl 3-keto-11β-hydroxy-16α-methylpregna-4,17(20)-dien-21-oate,

Methyl 3,11-diketo-16α-methylpregna-4,17(20)-dien-21-oate,

Methyl 3-keto-16α-methylpregna-4,9(11),17(20)-trien-21-oate; and methyl 3-keto-9α-fluoro-11β-hydroxy-16α-methylpregna-4,17(20)-dien-21-oate for Methyl 3-keto-9α-fluoro-11β-hydroxypregna-4,17(20)-dien-21-oate in Preparation 5 above is productive of Methyl 3-keto-11β-hydroxy-16α-methylpregna-1,4,17(20)-trien-21-oate, Methyl 3,11-diketo-16α-methylpregna-1,4,17(20)-trien-21-oate, Methyl 3-keto-16α-methylpregna-1,4,9(11),17(20)-tetraen-21-oate, and methyl 3-keto-9α-fluoro-11β-hydroxy-16α-methylpregna-1,4,17(20)-trien-21-oate, respectively.

PREPARATION 6

*Methyl 3-Keto-16α-Methylpregna-4,9(11),17(20)-Trien-21-Oate*

A mixture of 1 g. of methyl 3-keto-11β-hydroxy-16α-methylpregna-4,17(20)-dien-21-oate, 650 mg. of N-bromoacetamide and 6 ml. of pyridine is stirred in the dark for a period of 30 minutes. The mixture is cooled in an ice water bath and a stream of sulfur dioxide is directed onto the surface of the stirred mixture until a negative potassium iodide-starch test is obtained. Fifty ml. of water is then added to the mixture and the mixture is maintained at about 0–5° C. for about 30 minutes. The precipitated solid is separated by filtration and crystallized from, for example, acetone-water to obtain methyl 3-keto-16α-methylpregna-4,9(11),17(20)-trien-21-oate.

PREPARATION 7

*Methyl 3-Keto-9α-Fluoro-11β-Hydroxy-16α-Methylpregna-4,17(20)-Dien-21-Oate*

One half gram of methyl 3-keto-16α-methylpregna-4,9(11),17(20)-trien-21-oate is dissolved in 20 ml. of methylene chloride and thereto is added a solution of 1 ml. of 71 percent perchloric acid in 10 ml. of water and 200 mg. of N-bromoacetamide in 50 ml. of tertiary butyl alcohol. The solution is maintained at room temperature for 15 minutes and then mixed with a solution of 0.3 g. of sodium sulfite in 12 ml. of water. The mixture is distilled at reduced pressure until the residual solution becomes cloudy. The product is then precipitated by the addition of 100 ml. of a mixture of ice-water. The crystalline precipitate is filtered, washed with water and then dried and recrystallized from a mixture is distilled at reduced pressure until the residual methyl 3-keto-9α-bromo-11β-hydroxy-16α-methylpregna-4,17(20)-dien-21-oate.

A mixture of 0.45 g. of methyl 3-keto-9α-bromo-11β-hydroxy-16α-pregna-4,17(20)-dien-21-oate, 0.45 g. of anhydrous potassium acetate and 20 ml. of acetone is heated at its refluxing temperature for a period of 5 hrs. The mixture is then cooled and poured into water and extracted with methylene chloride. The methylene chloride extract is dried and poured over a column of 25 g. of Florisil (synthetic magnesium silicate). The column is developed with commercial hexanes containing increasing portions of acetone. The eluates are evaporated to dryness and those fractions shown by infrared and papergram analysis to contain methyl 3-keto-9(11)-oxido-16α-methylpregna-4,17(20)-dien-21-oate are combined and crystallized, for example, from acetone-hexanes mixture.

One gram of methyl 3-keto-9(11)-oxido-16α-methylpregna-4,17(20)-dien-21-oate is dissolved in 50 ml. of methylene chloride and thereto is added 5 ml. of 48 percent hydrofluoric acid. The mixture is stirred vigorously for 6 hrs. and then poured into an excess of cold aqueous 5 percent sodium bicarbonate solution. The methylene chloride layer is separated, dried over anhydrous sodium sulfate and then poured onto a column of 100 g. of Florisil (synthetic magnesium silicate). The column is developed with commercial hexanes containing increasing portions of acetone. The eluates are evaporated to dryness and those fractions shown by infrared and papergram analysis to contain methyl 3-keto-9α - fluoro - 11β - hydroxy - 16α - methylpregna - 4,17(20)-dien-21-oate are combined and recrystallized, for example, from acetone-hexanes mixture.

PREPARATION 8

*Methyl 3,11-Diketo-9α-Fluoropregna-4,17(20)-Dien-21-Oate*

A solution of 2 g. of methyl 3-keto-9α-fluoro-11β-hydroxypregna-4,17(20)-dien-21-oate in 120 ml. of acetic acid at 20° is prepared. To this solution is added dropwise 0.41 g. of chromium trioxide in 41 ml. of acetic acid and 0.4 ml. of water. The temperature is maintained at 19 to 23° C. during the addition and for one and one-half hours thereafter. The reaction mixture is diluted with 600 ml. of water and extracted with six 100-ml. portions of methylene chloride which are combined. The combined extracts are washed with dilute sodium bicarbonate solution and water, dried and evaporated to dryness under reduced pressure. Recrystallization of the solid residue from methanol gives methyl 3,11-diketo-9α-fluoropregna-4,17(20)-dien-21-oate.

Similarly, substituting a stoichiometrically equivalent amount of methyl 3-keto-9α-fluoro-11β-hydroxypregna-1,4,-17(20) - trien - 21-oate for methyl 3-keto-9α-fluoro-11β-hydroxypregna-4,17(20)-dien-21-oate in Preparation 8 above is productive of methyl 3,11-diketo-9α-fluoropregna-1,4,17(20)-trien-21-oate.

Similarly, substituting a stoichiometrically equivalent amount of methyl 3-keto-9α - fluoro - 11β - hydroxy-16α-methylpregna-4,17(20)-dien-21-oate and methyl 3-keto-9α-fluoro-11β-hydroxy - 16α - methylpregna - 1,4,17(20)-trien-21-oate for methyl 3-keto-9α-fluoro - 11β - hydroxypregna-4,17(20)-dien-21-oate in Preparation 8 above is productive of methyl 3,11 - diketo - 16α - methylpregna-4,17(20)-dien-21-oate and methyl 3,11-diketo-16α-methylpregna-1,4,17(20)-trien-21-oate, respectively.

EXAMPLE 1

*3β,16β-Dihydroxy-11-Keto-5α-Pregn-17(20)-En-21-Oic Acid γ-Lactone and the 3β-Acetoxy Derivative Thereof*

1A. 3β-HYDROXY-11-KETO-5α-PREGN-16(17)-EN-21-OIC ACID

To a solution of 29.1 g. of methyl 3β-hydroxy-11-keto-5α-pregn-17(20)-en-21-oate in 350 ml. of methanol there was added a solution of 29.1 g. of potassium hydroxide in 100 ml. of water. The reaction mixture was then heated under reflux for about 3 hours, cooled, poured into water, and extracted with methylene chloride. The alkaline aqueous solution, comprising 3β-hydroxy-11-keto-5α-pregn-16(17)-en-21-oic acid, obtained from the extraction was acidified with dilute hydrochloric acid and extracted with several portions of ethyl acetate. The ethyl acetate extracts were combined, washed with water until neutral, dried over sodium sulfate, followed by removal of the solvent in vacuo to give a residue. The residue was then fractionally crystallized from acetone and yielded a first crop of crystalline material. The mother liquor remaining was taken to dryness leaving a residue which was crystallized from ether to give a second crop of crystalline material. The crystalline material obtained from the acetone crystallization (first crop) and from the ether crystallization (second crop) were combined to give 6.95 g. of 3β-hydroxy-11-keto-5α-pregn-17(20)-en-21-oic acid having a melting point of 270–276° C., which upon recrystallization from methanol had a melting point of 273–276° C.

3β-hydroxy-11-keto-5α-pregn - 17(20)-en-21-oic acid is reesterified, according to procedures known in the art for the esterification of steroid free acids, such as those disclosed by Reindel and Niederlander, Ber. 68B, 1969–73 (1935) to give the corresponding 21-methyl ester, which is then recycled as the starting material in the above-described reaction.

The mother liquors from the ether crystallization yielded a third crop (8.16 g., melting point 176–184° C.) of crystals comprising 3β-hydroxy-11-keto-5α-pregn-16(17)-en-21-oic acid. Two recrystallizations of the third crop from acetone-commercial hexanes gave an analytical sample of 3β-hydroxy-11-keto-5α-pregn-16(17)-en-21-oic acid having a melting point of 188–190° C., infrared absorption bands (Nujol) at 3450, 3370, 2720, 2600, 1725, 1700, 1210, 1170 and 1030 cm.$^{-1}$ and the following analysis:

Analysis.—Calcd. for $C_{21}H_{30}O_4$: C, 72.80; H, 8.73. Found: C, 72.64; H, 8.87.

Similarly, substituting a stoichiometric equivalent amount of the starting materials used for the preparation of the compounds of Formula 1, namely, Methyl 3-ketopregna-4,17(20)-dien-21-oate,
Methyl 3-ketopregna-1,4,17(20)-trien-21-oate,
Methyl 3-keto-11β-hydroxypregna-4,17(20)-dien-21-oate,
Methyl 3-keto-11β-hydroxypregna-1,4,17(20)-trien-21-oate,
Methyl 3,11-diketopregna-4,17(20)-dien-21-oate,
Methyl 3,11-diketopregna-1,4,17(20)-trien-21-oate,
Methyl 3-keto-9α-fluoro-11β-hydroxypregna-4,17(20)-dien-21-oate,
Methyl 3-keto-9α-fluoro-11β-hydroxypregna-1,4,17(20)-trien-21-oate,
Methyl 3,11-diketo-9α-fluoropregna-4,17(20)-dien-21-oate,
Methyl 3,11-diketo-9α-fluoropregna-1,4,17(20)-trien-21-oate,
Methyl 3-ketopregna-4,9(11),17(20)-trien-21-oate, and
Methyl 3-ketopregna-1,4,9(11),17(20)-tetraen-21-oate for methyl 3β-hydroxy-11-keto-5α-pregn-17(20)-en-21-oate in Example 1A above is productive of the Δ$^{16}$ compounds useful as intermediates in the production of the compounds of Formula 1 and the 21-free acids otherwise corresponding to the 21-methyl ester starting material used for the preparation of the compounds of Formula 1 namely, 3-ketopregna-4,16(17)-dien-21-oic acid and
3-ketopregna-4,17(20)-dien-21-oic acid,
3-ketopregna-1,4,16(17)-trien-21-oic acid and
3-keto-pregna-1,4,17(20)-trien-21-oic acid
3-keto-11β-hydroxypregna-4,16(17)-dien-21-oic acid and
3-keto-11β-hydroxypregna-4,17(20)-dien-21-oic acid,
3-keto-11β-hydroxypregna-1,4,16(17)-trien-21-oic acid and
3-keto-11β-hydroxypregna-1,4,17(20)-trien-21-oic acid,
3,11-diketopregna-4,16(17)-dien-21-oic acid and
3,11-diketopregna-4,17(20)-dien-21-oic acid,
3,11-diketopregna-1,4,16(17)-trien-21-oic acid and
3,11-diketopregna-1,4,17(20)-trien-21-oic acid,
3-keto-9α-fluoro-11β-hydroxypregna-4,16(17)-dien-21-oic acid and
3-keto-9α-fluoro-11β-hydroxypregna-4,17(20)-dien-21-oic acid,
3-keto-9α-fluoro-11β-hydroxypregna-1,4,16(17)-trien-21-oic acid and
3-keto-9α-fluoro-11β-hydroxypregna-1,4,17(20)-trien-21-oic acid,
3,11-diketo-9α-fluoropregna-4,16(17)-dien-21-oic acid and
3,11-diketo-9α-fluoropregna-4,17(20)-dien-21-oic acid,
3,11-diketo-9α-fluoropregna-1,4,16(17)-trien-21-oic acid and
3,11-diketo-9α-fluoropregna-1,4,17(20)-trien-21-oic acid,
3-ketopregna-4,9(11),16(17)-trien-21-oic acid and
3-ketopregna-4,9(11),17(20)-trien-21-oic acid, and
3-ketopregna-1,4,9(11),16(17)-tetraen-21-oic acid and
3-ketopregna-1,4,9(11),17(20)-tetraen-21-oic acid, respectively.

Similarly, substituting a stoichiometric equivalent amount of the starting materials used for the preparation of the compounds of Formula 2a, namely, Methyl 2α-methyl-3-keto-11β-hydroxypregna-4,17(20)-dien-21-oate,
Methyl 2α-methyl-3-11-diketopregna-4,17(20)-dien-21-oate,
Methyl 2α-methyl-3-keto-9α-fluoro-11β-hydroxypregna-4,17(20)-dien-21-oate,
Methyl 2α-methyl-3,11-diketo-9α-fluoropregna-4,17(20)-dien-21-oate, and
Methyl 2α-methyl-3-ketopregna-4,9(11),17(20)-trien-21-oate for
Methyl 3β-hydroxy-11-keto-5α-pregn-17(20)-en-21-oate in Example 1A above is productive of the Δ$^{16}$ compounds useful as intermediates in the production of the compounds of Formula 2a and the 21-free acids otherwise corresponding to the 21-methyl ester starting material used for the preparation of the compounds of Formula 2a, namely, 2α-methyl-3-keto-11β-hydroxypregna-4,16(17)-dien-21-oic acid and
2α-methyl-3-keto-11β-hydroxypregna-4,17(20)-dien-21-oic acid,
2α-methyl-3,11-diketopregna-4,16(17)-dien-21-oic acid and
2α-methyl-3,11-diketopregna-4,17(20)-dien-21-oic acid,
2α-methyl-3-keto-9α-fluoro-11β-hydroxypregna-4,16(17)-dien-21-oic acid and
2α-methyl-3-keto-9α-fluoro-11β-hydroxypregna-4,17(20)-diene-21-oic acid,
2α-methyl-3,11-diketo-9α-fluoropregna-4,16(17)-dien-21-oic acid and
2α-methyl-3,11-diketo-9α-fluoropregna-4,17(20)-dien-21-oic acid, and
2α-methyl-3-ketopregna-4,9(11),16(17)-trien-21-oic acid and
2α-methyl-3-ketopregna-4,9(11),17(20)-trien-21-oic acid, respectively.

Similarly, substituting a stoichiometric equivalent amount of the starting materials used for the preparation of the compounds of Formula 2b, namely, Methyl 3-keto-6α-methylpregna-4,17(20)-dien-21-oate,
Methyl 3-keto-6α-methyl-11β-hydroxypregna-4,17(20)-dien-21-oate,
Methyl 3-keto-6α-methyl-11β-hydroxypregna-1,4,17(20)-trien-21-oate,
Methyl 3,11-diketo-6α-methylpregna-4,17(20)-dien-21-oate,
Methyl 3,11-diketo-6α-methylpregna-1,4,17(20)-trien-21-oate,
Methyl 3-keto-6α-methyl-9α-fluoro-11β-hydroxypregna-4,17(20)-dien-21-oate,
Methyl 3-keto-6α-methyl-9α-fluoro-11β-hydroxypregna-1,4,17(20)-trien-21-oate,
Methyl 3,11-diketo-6α-methyl-9α-fluoropregna-4,17(20)-dien-21-oate,
Methyl 3,11-diketo-6α-methyl-9α-fluoropregna-1,4,17(20)-trien-21-oate,
Methyl 3-keto-6α-methylpregna-4,9(11),17(20)-trien-21-oate, and
Methyl 3-keto-6α-methylpregna-1,4,9(11),17(20)-tetraen-21-oate for methyl 3β-hydroxy-11-keto-5α-pregn-1(20)-en-21-oate in Example 1A above is productive of the Δ$^{16}$ compounds useful as intermediates in the production of the compounds of Formula 2b and the 21-free acids otherwise corresponding to the 21-methyl ester starting material used for the preparation of the compounds of Formula 2b, namely, 3-keto-6α-methylpregna-4,16(17)-dien-21-oic acid and
3-keto-6α-methylpregna-4,17(20)-dien-21-oic acid,
3-keto-6α-methyl-11β-hydroxypregna-4,16(17)-dien-21-oic acid and
3-keto-6α-methyl-11β-hydroxypregna-4,17(20)-dien-21-oic acid, 3-keto-6α-methyl-11β-hydroxypregna-1,4,17(20)-trien-21-oic acid and
3-keto-6α-methyl-11β-hydroxypregna-1,4,16(17)-trien-21-oic acid,
3,11-diketo - 6α - methylpregna-4,16(17)-dien-21-oic acid and
3,11-diketo-6α-methylpregna-4,17(20)-dien-21-oic acid,
3,11-diketo-6α-methylpregna-1,4,16(17)-trien-21-oic acid and
3,11-diketo-6α-methylpregna-1,4,17(20)-trien-21-oic acid,
3 - keto - 6α - methyl - 9α - fluoro - 11β - hydroxypregna-4,16(17)-dien-21-oic acid and
3 - keto - 6α - methyl - 9α - fluoro - 11β - hydroxypregna-4,17(20)-dien-21-oic acid,
3 - keto - 6α - methyl - 9α - fluoro - 11β - hydroxypregna-1,4,16(17)-trien-21-oic acid and
3 - keto - 6α - methyl - 9α - fluoro - 11β - hydroxypregna-1,4,17(20)-trien-21-oic acid,
3,11 - diketo-6α-methyl-9α-fluoropregna-4,16(17)-dien-21-oic acid and
3,11 - diketo-6α-methyl-9α-fluoropregna-4,17(20)-dien-21-oic acid,
3,11 - diketo-6α-methyl-9α-fluoropregna-1,4,16(17)-trien-21-oic acid and
3,11 - diketo-6α-methyl-9α-fluoropregna-1,4,17(20)-trien-21-oic acid,
3-keto-6α-methylpregna-4,9(11),16(17)-trien-21-oic acid and
3-keto-6α-methylpregna-4,9(11),17(20)-trien-21-oic acid, and
3 - keto-6α-methylpregna-1,4,9(11),16(17)-tetraen-21-oic acid and
3 - keto-6α-methylpregna-1,4,9(11),17(20)-tetraen-21-oic acid, respectively.

Similarly, substituting a stoichiometric equivalent amount of the starting materials used for the preparation of the compounds of Formula 2c, namely, Methyl 3-keto-11β-hydroxy-16β-methyl- and methyl 3--keto-11β-hydroxy-16α-methylpregna-4,17(20)-dien-21-oate,
Methyl 3-keto-11β-hydroxy-16β-methyl- and methyl 3-keto - 11β-hydroxy-16α-methylpregna-1,4,17(20)-trien-21-oate,
Methyl 3,11-diketo-16β-methyl- and methyl 3,11-diketo-16α-methylpregna-4,17(20)-dien-21-oate,
Methyl 3,11-diketo-16β-methyl- and methyl 3,11-diketo-16α-methylpregna-1,4,17(20)-trien-21-oate,
Methyl 3 - keto-9α-fluoro-11β-hydroxy-16β-methyl- and methyl 3-keto-9α-fluoro-11β-hydroxy-16α-methylpregna-4,17(20)-dien-21-oate,
Methyl 3 - keto-9α-fluoro-11β-hydroxy-16β-methyl- and methyl 3-keto-9α-fluoro-11β-hydroxy-16α-methylpregna-1,4,17(20)-trien-21-oate,
Methyl 3,11-diketo-9α-fluoro-16β-methyl- and methyl 3,11 - diketo - 9α - fluoro-16α-methylpregna-4,17(20)-dien-21-oate,
Methyl 3,11-diketo-9α-fluoro-16β-methyl- and methyl 3,11 - diketo - 9α - fluoro-16α-methylpregna-1,4,17(20)-trien-21-oate,
Methyl 3-keto-16β-methyl- and methyl 3-keto-16α-methylpregna-4,9(11),17(20)-trien-21-oate, and
Methyl 3-keto-16β-methyl- and methyl 3-keto-16α-methylpregna-1,4,9(11),17(20)-tetraen-21-oate for methyl 3β-hydroxy-11-keto-5α-pregn-17(20)-en-21-oate in Example 1A above is productive of the Δ$^{16}$ compounds useful as intermediates in the production of the compounds of Formula 2c and the 21-free acids otherwise corresponding to the 21-methyl ester starting material used for the preparation of the compounds of Formula 2c, namely, 3-keto-11β-hydroxy-16-methylprenga-4,16(17)-dien-21-oic acid and 3-keto-11β-hydroxy-16β-methyl- and 3-keto-11β-hydroxy-6α-methylpregna-4,17(20)-dien-21-oic acid.

3 - keto - 11β - hydroxy-16-methylpregna-1,4,16(17)-trien-21-oic acid and 3-keto-11β-hydroxy-16β-methyl- and
3 - keto - 11β - hydroxy-16α-methylpregna-1,4,17(20)-trien-21-oic acid,
3,11 - diketo - 16-methylpregna-4,16(17)-dien-21-oic acid and 3,11-diketo-16β-methyl and 3,11-diketo-16α-methylpregna-4,17(20)-dien-21-oic acid,
3,11 - diketo-16-methylpregna-1,4,16(17-trien-21-oic acid and 3,11-diketo-16β-methyl and 3,11-diketo-16α-methylpregna-1,4,17(20)-trien-21-oic acid,
3 - keto - 9α - fluoro - 11β-hydroxy-16-methylpregna-4,16(17)-dien-21-oic acid and 3-keto-9α-fluoro-11β-hydroxy-16β-methyl- and 3-keto-9α-fluoro-11β-hydroxy-16α-methylpregna-4,17(20)-dien-21-oic acid,
3 - keto - 9α - fluoro-11β-hydroxy-16-methylpregna-1,4,16(17)-trien-21-oic acid and 3-keto-9α-fluoro-11β-hydroxy-16β-methyl- and 3-keto-9α-fluoro-11β-hydroxy-16α-methylpregna-1,4,17(20)-trien-21-oic acid,
3,11 - diketo - 9α - fluoro-16-methylpregna-4,16(17)-dien-21-oic acid and 3,11-diketo-9α-fluoro-16β-methyl- and 3,11 diketo-9α-fluoro-16α-methylpregna-4,17(20)-dien-21-oic acid,
3,11 - diketo-9α-fluoro-16-methylpregna-1,4,16(17)-trien-21-oic acid and 3,11-diketo-9α-fluoro-16β-methyl- and 3,11 - diketo - 9α - fluoro-16α-methylpregna-1,4,17(20)-trien-21-oic acid,
3-keto-16-methylpregna-4,9(11)-,16(17)-trien-21-oic acid and
3-keto-16β-methyl- and 3-keto-16α-methylpregna-4,9(11),17(20)-trien-21-oic acid, and
3-keto-16β-methyl- and 3-keto-16α-methylpregna-1,4,9(11),17(20)-tetraen-21-oic acid, respectively.

Similarly, substituting a stoichiometric equivalent amount of the starting materials used for the preparation of the compounds of Formula 3, namely, Methyl 3-keto-11α-hydroxypregna-4,17(20)-dien-21-oate and methyl 3-keto-11α-hydroxypregna-1,4,17(20)-trien-21-oate for methyl 3β-hydroxy-11-keto-5α-pregn-17(20)-en-21-oate in Example 1A above is productive of the Δ$^{16}$ compounds useful as intermediates in the production of the compounds of Formula 3 and the 21-free acids otherwise corresponding to the 21-methyl ester starting material used for the preparation of the compounds of Formula 3, namely,
3-keto-11α-hydroxypregna-4,16(17)-dien-21-oic acid and
3-keto-11α-hydroxypregna-4,17(20)-dien-21-oic acid, and
3 - keto - 11α-hydroxypregna-1,4,16(17)-trien-21-oic acid and
3 - keto - 11α-hydroxypregna-1,4,17(20)-trien-21-oic acid, respectively.

Similarly, substituting a stoichiometric equivalent amount of the starting materials used for the preparation of the compounds of Formula 4a namely, Methyl 3β-hydroxy-5α-pregn-17(20)-en-21-oate,
Methyl 3β,11β - dihydroxy - 5α-pregn-17(20)-en-21-oate, and
Methyl 3β,11α-dihydroxy-5α-pregn-17(20)-en-21-oate for methyl 3β - hydroxy - 11 - keto-5α-pregn-17(20)-en-21-oate in Example 1A above is productive of the Δ$^{16}$ compounds useful as intermediates in the production of the compounds of Formula 4a and the 21-free acids otherwise corresponding to the 21-methyl ester starting material used for the preparation of the compounds of Formula 4a, namely,
3β-hydroxy-5α-pregn-16(17)-en-21-oic acid and
3β-hydroxy-5α-pregn-17(20)-en-21-oic acid,
3β,11β-dihydroxy-5α-pregn-16(17)-en-21-oic acid and
3β,11β-dihydroxy-5α-pregn-17(20)-en-21-oic-acid, and
3β,11α-dihydroxy-5α-pregn-16(17)-en-21-oic acid and
3β,11α-dihydroxy-5α-pregn-17(20)-en-21-oic acid, respectively.

Similarly, substituting a stoichiometric equivalent amount of the starting materials used for the preparation of the compounds of Formula 4b, namely, Methyl 3α-hydroxy-5β-pregn-17(20)-en-21-oate,
Methyl 3α,11β-dihydroxy-5β-pregn-17(20)-en-21-oate,
Methyl 3α - hydroxy-11-keto-5β-pregn-17(20)-en-21-oate and
Methyl 3α,11α-dihydroxy-5β-pregn-17(20)-en-21-oate for methyl 3β-hydroxy-11-keto-5α-pregn-17(20)-en-21-oate in Example 1A above is productive of the Δ$^{16}$ compounds useful as intermediates in the production of the compounds of Formula 4b and the 21-free acids otherwise corresponding to the 21-methyl ester starting material used for the preparation of the compounds of Formula 4b, namely, 3α-hydroxy-5β-pregn-16(17)-en-21-oic acid and
3α-hydroxy-5β-pregn-17(20)-en-21-oic acid,
3α,11β-dihydroxy-5β-pregn-16(17)-en-21-oic acid and
3α,11β-dihydroxy-5β-pregn-17(20)-en-21-oic acid,
3α-hydroxy-11-keto-5β-pregn-16(17)-en-21-oic acid and
3α-hydroxy-11-keto-5β-pregn-17(20)-en-21-oic acid, and
3α,11α-dihydroxy-5β-pregn-16(17)-en-21-oic acid and
3α,11α-dihydroxy-5β-pregn-17(20)-en-21-oic acid, respectively.

Similarly, substituting a stoichiometric equivalent amount of the starting materials used for the preparation of the compounds of Formula 5a, namely, Methyl 3β,11β-dihydroxy-16β-methyl- and methyl 3β,11β-dihydroxy-16α-methyl-5α-pregn-17(20)-en-21-oate and
Methyl 3β-hydroxy-11-keto-16β-methyl- and methyl 3β-hydroxy - 11 - keto-16α-methyl-5α-pregn-17(20)-en-21-oate for
Methyl 3β-hydroxy-11-keto-5α-pregn-17(20)-en-21-oate in Example 1A above is productive of the Δ$^{16}$ compounds useful as intermediates in the production of the compounds of Formula 5a and the 21-free acids otherwise corresponding to the 21-methyl ester starting material used for the preparation of the compounds of Formula 5a, namely, 3β,11β - dihydroxy - 16-methyl-5α-pregn-16(17)-en-21-oic acid and
3β,11β-dihydroxy-16β-methyl- and 3β,11β-dihydroxy-16α-methyl-5α-pregn-17(20)-en-21-oic acid, and
3β - hydroxy - 11-keto-16-methyl-5α-pregn-16(17)-en-21-oic acid and 3β-hydroxy-11-keto-16β-methyl- and 3β-hydroxy-11-keto-16α-methyl-5α-pregn-17(20)-en-21-oic acid, respectively.

Similarly, substituting a stoichiometric equivalent amount of the starting materials used for the preparation of the compounds of Formula 5b, namely, Methyl 3α,11β-dihydroxy-16β-methyl- and methyl 3α,11β-dihydroxy-16α-methyl-5β-pregn-17(20)-en-21-oate and
Methyl 3α-hydroxy-11-keto-16β-methyl- and methyl 3α-hydroxy - 11 - keto-16α-methyl-5β-pregn-17(20)-en-21-oate for
Methyl 3β - hydroxy-11-keto-5α-pregn-17(20)-en-21-oate in Example 1A above is productive of the Δ$^{16}$ compounds useful as intermediates in the production of the compounds of Formula 5b and the 21-free acids otherwise corresponding to the 21-methyl ester starting material used for the preparation of the compounds of Formula 5b, namely, 3α,11β - dihydroxy - 16-methyl-5β-pregn-16(17)-en-21-oic acid and
3α,11β-dihydroxy-16β-methyl- and 3α,11β-dihydroxy-16α-methyl-5β-pregn-17(20)-en-21-oic acid, and
3α-hydroxy-11-keto-16-methyl-5β-pregn-16(17)-en-21-oic acid and 3α-hydroxy-11-keto-16β-methyl- and 3α-hydroxy - 11 - keto-16α-methyl-5β-pregn-17(20)-en-21-oic acid, respectively.

Similarly, substituting a stoichiometric equivalent amount of the starting materials used for the preparation of the compounds of Formula 6, namely, Methyl 3β-hydroxypregna-5(6),17(20)-dien-21-oate,
Methyl 3β,11β - dihydroxypregna - 5(6),17(20)-dien-21-oate,
Methyl 3β - hydroxy-11-ketopregna-5(6),17(20)-dien-21-oate and
Methyl 3β,11α-dihydroxypregna-5(6),17(20)-dien-21-oate for methyl 3β-hydroxy-11-keto-5α-pregn-17(20)-en-21-oate in Example 1A above is productive of the Δ$^{16}$ compounds useful as intermediates in the production of the compounds of Formula 6 and the 21-free acids otherwise corresponding to the 21-methyl ester starting material used for the preparation of the compounds of Formula 6, namely, 3β-hydroxypregna-5(6),16(17)-dien-21-oic acid and
3β-hydroxypregna-5(6),17(20)-dien-21-oic acid,
3β,11β-dihydroxypregna-5(6),16(17)-dien-21-oic acid and
3β-11β-dihydroxypregna-5(6),17(20)-dien-21-oic acid,
3β - hydroxy-11-ketopregna-5(6),16(17)-dien-21-oic acid and
3β - hydroxy-11-ketopregna-5(6),17(20)-dien-21-oic acid, and
3β,11α - dihydroxypregna-5(6),16(17) - dien - 21-oic acid and
3β,11α-dihydroxypregna-5(6),17(20)-dien-21-oic acid, respectively.

Similarly, substituting a stoichiometric equivalent amount of the starting materials used for the preparation of the compounds of Formula 7a, namely, Methyl 3β-hydroxy-6-methylpregna-5(6),17(20)-dien-21-oate,
Methyl 3β,11β - dihydroxy-6-methylpregna-5(6),17(20)-dien-21-oate and
Methyl 3β-hydroxy-6-methyl-11-ketopregna-5(6),17(20)-dien-21-oate for
Methyl 3β-hydroxy-11-keto-5α-pregn-17(20)-en-21-oate in Example 1A above is productive of the Δ$^{16}$ compounds useful as intermediates in the production of the compounds of Formula 7a and the 21-free acids otherwise corresponding to the 21-methyl ester starting material used for the preparation of the compounds of Formula 7a, namely, 3β-hydroxy-6-methylpregna-5(6),16(17)-dien-21-oic acid and
3β-hydroxy-6-methylpregna-5(6),17(20)-dien-21-oic acid,
3β,11β - dihydroxy-6-methylpregna-5(6),16(17)-dien-21-oic acid and
3β,11β - dihydroxy-6-methylpregna-5(6),17(20)-dien-21-oic acid, and
3β-hydroxy-6-methyl-11-ketopregna-5(6),16(17)-dien-21-oic acid and
3β - hydroxy - 6-methyl-11-ketopregna-5(6),17(20)-dien-21-oic acid, respectively.

Similarly, substituting a stoichiometric equivalent amount of the starting materials used for the preparation of the compounds of Formula 7b, namely, Methyl 3β-hydroxy-16β-methyl- and methyl 3β-hydroxy-16α-methylpregna-5(6),17(20)-dien-21-oate,
Methyl 3β,11β-dihydroxy-16β-methyl- and methyl 3β,11β-dihydroxy - 16α - methylpregna - 5(6),17,(20) - dien-21-oate, and
Methyl 3β-hydroxy-11-keto-16β-methyl- and methyl 3β-hydroxy - 11 - keto - 16α - methylpregna - 5(6),17(20)-dien-21-oate for methyl 3β-hydroxy-11-keto-5α-pregn-17(20)-en-21-oate in Example 1A above is productive of the Δ$^{16}$ compounds useful as intermediates in the production of the compounds of Formula 7b and the 21-free acids otherwise corresponding to the 21-methyl ester starting material used for the preparation of the compounds of Formula 7b, namely, 3β - hydroxy - 16 - methylpregna - 5(6),16(17) - dien-21-oic acid and
3β - hydroxy - 16β - methyl- and 3β - hydroxy - 16α-methylpregna-5(6),17(20)-dien-21-oic acid,
3β,11β - dihydroxy - 16 - methylpregna - 5(6),16(17)-dien-21-oic acid and
3β,11β - dihydroxy - 16β - methyl- and 3β,11β - dihydroxy - 16α - methylpregna - 5(6),17(20) - dien - 21-oic acid and 3β - hydroxy - 11 - keto - 16 - methylpregna - 5(6),16(17)-dien-21-oic acid and 3β - hydroxy - 11 - keto - 16β - methyl- and 3β - hydroxy-11 - keto - 16α - methylpregna - 5(6),17(20) - dien-21-oic acid, respectively.

The above described Δ$^{17(20)}$-21-free acids are reesterified, according to procedures known in the art for the esterification of 21-free acids, such as those disclosed by Reindel and Niederlander, Ber. 68B, 1969–73 (1935), to convert them back to the Δ$^{17(20)}$-21-methyl esters and recycled for use as starting materials.

1B. 3β,16β-DIHYDROXY-11-KETO-17α-IODO-5α-PREGNAN-21-OIC ACID γ-LACTONE

To a solution containing 1.0 g. of 3β-hydroxy-11-keto-5α-pregn-16(17)-en-21-oic acid, 1.6 g. of potassium bicarbonate and 25 ml. of water there was added a solution containing 2.5 g. of iodine and 6.0 g. of potassium iodide in 50 ml. of water. The thus obtained reaction mixture, comprising 3β,16β - dihydroxy - 11 - keto - 17α - iodo-5α-pregnan-21-oic acid γ-lactone was stirred for about 30 minutes and then allowed to stand overnight at room temperature. The reaction mixture was extracted with methylene chloride and the methylene chloride solution was washed successively with sodium thiosulfate solution, sodium bicarbonate solution, and water, dried over sodium sulfate, and the solvent was removed leaving a crystalline residue which was triturated with methanol. Removal of the methanol yielded a crystalline material, comprising 3β,16β - dihydroxy - 11 - keto - 17α - iodo-5α-pregnan-21-oic acid γ-lactone having a melting point of 220° C. (dec.). Recrystallization of the crystalline material from acetone-commercial hexanes yielded an analytical sample of 3β,16β-dihydroxy-11-keto-17α-iodo-5α-pregnan-21-oic acid γ-lactone having a melting point of 223°-229° C. (dec.), infrared absorption bands (Nujol) at 3540, 1770, 1705, 1165, 1135, and 1035 cm.$^{-1}$ and the following analysis:

*Analysis.*—Calcd. for $C_{21}H_{29}O_4I$: C, 53.34; H, 6.14; I, 26.9. Found: C, 54.75; H, 6.70; I, 23.72.

The substitution of bromine for iodine and potassium bromide for potassium iodide is productive of 3β,16β-dihydroxy - 11 - keto - 17α - bromo - 5α - pregnan - 21-oic acid γ-lactone.

The substitution of chlorine for iodine and potassium chloride for potassium iodide is productive of 3β,16β-dihydroxy - 11 - keto - 17α - chloro - 5α - pregnan - 21-oic acid γ-lactone.

Similarly, substituting a stoichiometric equivalent amount of 3-ketopregna-4,16(17)-dien-21-oic acid,
3-ketopregna-1,4,16(17)-trien-21-oic acid,
3-keto-11β-hydroxypregna-4,16(17)-dien-21-oic acid,
3-keto-11β-hydroxypregna-1,4,16(17)-trien-21-oic acid,
3,11-diketopregna-4,16(17)-dien-21-oic acid,
3,11-diketopregna-1,4,16(17)-trien-21-oic acid,
3 - keto - 9α - fluoro - 11β - hydroxypregna - 4,16(17)-dien-21-oic acid,
3 - keto - 9α - fluoro - 11β - hydroxypregna - 1,4,16(17)-trien-21-oic acid,
3,11-diketo-9α-fluoropregna-4,16(17)-dien-21-oic acid,
3,11-diketo-9α-fluoropregna-1,4,16(17)-trien-21-oic acid,
3-ketopregna-4,9(11),16(17)-trien-21-oic acid, and
3-ketopregna-1,4,9(11),16(17)-tetraen-21-oic acid for 3β-hydroxy-11-keto-5α-pregn-16(17)-en-21-oic acid in Example 1B above is productive of the 17α-iodolactones useful as intermediates in the production of the compounds of Formula 1, namely, 3 - keto - 16β - hydroxy - 17α - iodopregn - 4 - en - 21-oic acid γ-lactone,
3 - keto - 16β - hydroxy - 17α - iodopregna - 1,4 - dien-21-oic acid γ lactone,
3 - keto - 11β,16β - dihydroxy - 17α - iodopregn - 4 - en-21-oic acid γ-lactone,
3 - keto - 11β,16β - dihydroxy - 17α - iodopregna - 1,4-dien-21-oic acid γ-lactone,
3,11 - diketo - 16β - hydroxy - 17α - iodopregn - 4 - en-21-oic acid γ-lactone,
3,11 - diketo - 16β - hydroxy - 17α - iodopregna - 1,4-dien-21-oic acid γ-lactone,
3 - keto - 9α - fluoro - 11β,16β - dihydroxy - 17α - iodopregn-4-en-21-oic acid γ-lactone,
3 - keto - 9α - fluoro - 11β,16β - dihydroxy - 17α - iodopregna-1,4-dien-21-oic acid γ-lactone,
3,11 - diketo - 9α - fluoro - 16β - hydroxy - 17α - iodopregn-4-en-21-oic acid γ-lactone,
3,11 - diketo - 9α - fluoro - 16β - hydroxy - 17α -iodopregna-1,4-dien-21-oic acid γ-lactone,
3 - keto - 16β - hydroxy - 17α - iodopregna - 4,9(11)-dien-21-oic acid γ-lactone, and
3 - keto - 16β - hydroxy - 17α - iodopregna - 1,4,9(11)-trien-21-oic acid γ-lactone, respectively.

Similarly, substituting a stoichiometric equivalent amount of

2α-methyl-3-keto - 11β - hydroxypregna - 4,16(17)-dien-21-oic acid,
2α-methyl-3,11-diketopregna-4,16(17)-dien-21-oic acid,
2α-methyl-3-keto-9α-fluoro-11β-hydroxypregna - 4,16(17)-dien-21-oic acid,
2α-methyl-3,11-diketo-9α-fluoropregna - 4,16(17)-dien-21-oic acid, and
2α-methyl-3-ketopregna - 4,9(11),16(17)-trien-21-oic acid for 3β-hydroxy-11-keto-5α-pregn-16(17)-en-21-oic acid in Example 1B above is productive of the 17α-iodolactones useful as intermediates in the production of the compounds of Formula 2a, namely, 2α-methyl-3-keto-11β,16β-dihydroxy - 17α - iodopregn-4-en-21-oic acid γ-lactone,
2α-methyl-3,11-diketo-16β-hydroxy - 17α - iodopregna-4-en-21-oic acid γ-lactone,
2α-methyl-3-keto-9α - fluoro - 11β,16β - dihydroxy - 17α-iodopregn-4-en-21-oic acid γ-lactone,
2α-methyl-3,11-diketo-9α-fluoro-16β-hydroxy - 17α-iodopregn-4-en-21-oic acid γ-lactone, and
2α-methyl-3-keto-16β-hydroxy - 17α - iodopregna-4,9(11)-dien-21-oic acid γ-lactone, respectively.

Similarly, substituting a stoichiometric equivalent amount of 3-keto-6α-methylpregna-4,16(17)-dien-21-oic acid,
3-keto-6α-methyl-11β-hydroxypregna-4,16(17) - dien - 21-oic acid,
3-keto-6α-methyl-11β-hydroxypregna - 1,4,16(17) - trien-21-oic acid,
3,11-diketo-6α-methylpregna-4,16(17) - dien - 21-oic acid,
3,11-diketo-6α-methylpregna-1,4,16(17)-trien-21-oic acid,
3-keto-6α-methyl - 9α - fluoro-11β - hydroxypregna-4,16(17)-dien-21-oic acid,
3-keto-6α-methyl - 9α-fluoro - 11β-hydroxypregna-1,4,16(17)-trien-21-oic acid,
3,11-diketo-6α-methyl-9α-fluoropregna-4,16(17) - dien-21-oic acid,
3,11-diketo-6α-methyl-9α-fluoropregna - 1,4,16(17)-trien-21-oic acid,
3-keto-6α-methylpregna-4,9(11),16(17)-trien-21-oic acid, and
3-keto-6α-methylpregna-1,4,9(11),16(17) - tetraen - 21-oic acid for 3β-hydroxy-11-keto-5α-pregn-16(17)-en-21-oic acid in Example 1B above is productive of the 17α-iodolactones useful as intermediates in the production of the compounds of Formula 2b, namely, 3-keto-6α-methyl-16β-hydroxy-17α-iodopregn-4-en-21-oic acid γ-lactone,
3-keto-6α-methyl-11β,16β-dihydroxy - 17α - iodopregn-4-en-21-oic acid γ-lactone,
3-keto-6α-methyl-11β,16β-dihydroxy-17α-iodopregna-1,4-dien-21-oic acid γ-lactone, 3,11-diketo-6α-methyl-16β-hydroxy-17α-iodopregn-4-en-
21-oic acid γ-lactone,
3,11-diketo-6α-methyl-16β-hydroxy-17α-iodopregna-1,4-
dien-21-oic acid γ-lactone,
3-keto-6α-methyl-9α-fluoro-11β,16β-dihydroxy-17α-
iodopregn-4-en-21-oic acid γ-lactone,
3-keto-6α-methyl-9α-fluoro-11β,16β-dihydroxy-17α-
iodopregna-1,4-dien-21-oic acid γ-lactone,
3,11-diketo-6α-methyl-9α-fluoro-16β-hydroxy-17α-
iodopregn-4-en-21-oic acid γ-lactone,
3,11-diketo-6α-methyl-9α-fluoro-16β-hydroxy-17α-
iodopregna-1,4-dien-21-oic acid γ-lactone,
3-keto-6α-methyl-16β-hydroxy-17α-iodopregna-4,9(11)-
dien-21-oic acid γ-lactone and
3-keto-6α-methyl-16β-hydroxy-17α-iodopregna-1,4,9(11)-
trien-21-oic acid γ-lactone, respectively.

Similarly, substituting a stoichiometric equivalent
amount of 3-keto-11β-hydroxy-16-methylpregna-4,16(17)-dien-21-
oic acid,
3-keto-11β-hydroxy-16-methylpregna-1,4,16(17)-trien-
21-oic acid,
3,11-diketo-16-methylpregna-4,16(17)-dien-21-oic acid,
3,11-diketo-16-methylpregna-1,4,16(17)-trien-21-oic acid,
3-keto-9α-fluoro-11β-hydroxy-16-methylpregna-4,16(17)-
dien-21-oic acid,
3-keto-9α-fluoro-11β-hydroxy-16-methylpregna-1,4-16
(17)-trien-21-oic acid,
3,11-diketo-9α-fluoro-16-methylpregna-4,16(17)-dien-21-
oic acid,
3,11-diketo-9α-fluoro-16-methylpregna-1,4,16(17)-trien-
21-oic acid,
3-keto-16-methylpregna-4,9(11),16(17)-trien-21-oic acid,
and
3-keto-16-methylpregna - 1,4,9(11),16(17) - tetraen-21-
oic acid for 3β-hydroxy-11-keto-5α-pregn-16(17)-en-
21-oic acid in Example 1B above is productive of the
17α-iodolactones useful as intermediates in the pro-
duction of the compounds of Formula 2c, namely,
3-keto-11β,16-dihydroxy-16α-methyl-17α-iodopregn-4-
en-21-oic acid γ-lactone,
3-keto-11β,16β-dihydroxy-16α-methyl-17α-iodopregna-1,
4-dien-21-oic acid γ-lactone,
3,11-diketo-16β-hydroxy-16α-methyl-17α-iodopregn-4-en-
21-oic acid γ-lactone,
3,11-diketo-16β-hydroxy-16α-methyl-17α-iodopregna-1,4-
dien-21-oic acid γ-lactone,
3-keto-9α-fluoro-11β,16β-dihydroxy-16α-methyl-17α-
iodopregn-4-en-21-oic acid γ-lactone,
3-keto-9α-fluoro-11β,16β-dihydroxy-16α-methyl-17α-
iodopregna-1,4-dien-21-oic acid γ-lactone,
3,11-keto-9α-fluoro-16β-hydroxy-16α-methyl-17α-
iodopregn-4-en-21-oic acid γ-lactone,
3,11-diketo-9α-fluoro-16β-hydroxy-16α-methyl-17α-
iodopregna-1,4-dien-21-oic acid γ-lactone,
3-keto-16β-hydroxy-16α-methyl-17α-iodopregna-4,9(11)-
dien-21-oic acid γ-lactone and
3-keto-16β-hydroxy-16α-methyl-17β-iodopregna-1,4,9
(11)-trien-21-oic acid γ-lactone, respectively.

Similarly, substituting a stoichiometric equivalent
amount of 3-keto-11α-hydroxypregna-4,16(17)-dien-21-oic acid and
for
3-keto-11α-hydroxypregna-1,4-16(17)-trien-21-oic acid
for
3β-hydroxy-11-keto-5α-pregn-16(17)-en-21-oic acid in
Example 1B above is productive of the 17α-iodolac-
tones useful as intermediates in the production of the
compounds of Formula 3, namely,
3-keto-11α,16β-dihydroxy-17α-iodopregn-4-en-21-oic acid
γ-lactone and
3-keto-11α,16β-dihydroxy-17α-iodopregna-1,4-dien-21-oic
acid γ-lactone, respectively.

Similarly, substituting a stoichiometric equivalent
amount of

3β-hydroxy-5α-pregn-16(17)-en-21-oic acid,
3β,11β-dihydroxy-5α-pregn-16(17)-en-21-oic acid, and
3β,11α-dihydroxy-5α-pregn-16(17)-en-21-oic acid for
3β-hydroxy-11-keto-5α-pregn-16(17)-en-21-oic acid in Ex-
ample 1B above is productive of the 17α-iodolactones
useful as intermediates in the production of the com-
pounds of Formula 4a, namely,
3β,16β-dihydroxy-17α-iodo-5α-pregnan-21-oic acid γ-lac-
tone,
3β,11β,16β-trihydroxy-17α-iodo-5α-pregnan-21-oic acid γ-
lactone, and
3β,11α,16β-trihydroxy-17α-iodo-5α-pregnan-21-oic acid γ-
lactone, respectively.

Similarly, substituting a stoichiometric equivalent
amount of

3α-hydroxy-5β-pregn-16(17)-en-21-oic acid,
3α,11β-dihydroxy-5β-pregn-16(17)-en-21-oic acid,
3α-hydroxy-11-keto-5β-pregn-16(17)-en-21-oic acid, and
3α,11α-dihydroxy-5β-pregn-16(17)-en-21-oic acid for
3β-hydroxy-11-keto-5α-pregn-16(17)-en-21-oic acid in Ex-
ample 1B above is productive of the 17α-iodolactones
useful as intermediates in the production of the com-
pounds of Formula 4b, namely,
3α,16β-dihydroxy-17α-iodo-5β-pregan-21-oic acid γ-lac-
tone,
3α,11β - trihydroxy - 17α - iodo - 5β - pregnan - 21 - oic
acid γ-lactone,
3α,16β - dihydroxy - 11 - keto - 17α - iodo - 5β - pregnan-
21-oic acid γ-lactone, and
3α,11α,16β-trihydroxy-17α-iodo-5β-pregnan-21-oic acid γ-
lactone, respectively.

Similarly, substituting a stoichiometric equivalent
amount of

3β,11β - dihydroxy - 16 - methyl - 5α - pregn - 16(17)-
en-21-oic acid and
3β - hydroxy - 11 - keto - 16 - methyl - 5α - pregn - 16(17)-
en - 21 - oic acid for 3β - hydroxy - 11 - keto - 5α-
pregn-16(17)-en-21-oic acid in Example 1B above is
productive of the 17α-iodolactones useful as intermedi-
ates in the production of the compounds of Formula
5a, namely,
3β,11β,16β - trihydroxy - 16α - methyl - 17α - iodo - 5α-
pregnan-21-oic acid γ-lactone and
3β,16β - dihydroxy - 11 - keto - 16α - methyl - 17α - iodo-
5α-pregnan-21-oic acid γ-lactone, respectively.

Similarly, substituting a stoichiometric equivalent
amount of

3α,11β - dihydroxy - 16 - methyl - 5β - pregn - 16(17)-
en-21-oic acid and
3α - hydroxy - 11 - keto - 16 - methyl - 5β - pregn - 16(17)-
en - 21 - oic acid for 3β - hydroxy - 11 - keto - 5α-
pregn-16(17)-en-21-oic acid in Example 1B above is
productive of the 17α-iodolactones useful as intermedi-
ates in the production of the compounds of Formula
5b, namely,
3α,11β,16β - trihydroxy - 16α - methyl - 17α - iodo - 5β-
pregnan-21-oic acid γ-lactone and
3α,16β - dihydroxy - 11 - keto - 16α - methyl - 17α - iodo-
5β-pregnan-21-oic acid γ-lactone, respectively.

Similarly, substituting a stoichiometric equivalent
amount of

3β-hydroxypregna-5(6),16(17)-dien-21-oic acid,
3β,11β-dihydroxypregna-5(6),16(17)-dien-21-oic acid,
3β-hydroxy-11-ketopregna-5(6),16(17)-dien-21-oic acid,
3β,11α-dihydroxypregna-5(6),16(17)-dien-21-oic acid for
3β-hydroxy-11-keto-5α-pregn-16(17)-en-21-oic acid in
Example 1B above is productive of the 17α-iodolactones useful as intermediates in the production of the compounds of Formula 6, namely, 3β,16β-dihydroxy-17α-iodopregn-5(6)-en-21-oic acid γ-lactone, 3β,11β,16β - trihydroxy - 17α - iodopregn - 5(6) - en - 21-oic acid γ-lactone, 3β,16β - dihydroxy - 11 - keto - 17α - iodopregn - 5(6)-en-21-oic acid γ-lactone, and 3β,11α,16β-trihydroxy-17α-iodopregn-5(6)-en-21-oic acid γ-lactone, respectively.

Similarly, substituting a stoichiometric equivalent amount of

3β-hydroxy-6-methylpregna-5(6),16(17)-dien-21-oic acid,

3β,11β - dihydroxy - 6 - methylpregna - 5(6),16(17)-dien-21-oic acid, and

3β - hydroxy - 6 - methyl - 11 - ketopregna - 5(6),16(17)-dien-21-oic acid for 3β-hydroxy-11-keto-5α-pregn-16(17)-en-21-oic acid in Example 1B above is productive of the 17α-iodolactones useful as intermediates in the production of the compounds of Formula 7a, namely, 3β,16β - dihydroxy - 6 - methyl - 17α - iodopregn - 5(6)-en-21-oic acid γ-lactone, 3β,11β,16β - trihydroxy - 6 - methyl - 17α - iodopregn-5(6)-en-21-oic acid γ-lactone, and 3β,16β - dihydroxy - 6 - methyl - 11 - keto - 17α - iodopregn-5(6)-en-21-oic acid γ-lactone, respectively.

Similarly, substituting a stoichiometric equivalent amount of

3β - hydroxy - 16 - methylpregna - 5(6),16(17) - dien - 21-oic acid,

3β,11β - dihydroxy - 16 - methylpregna - 5(6),16(17)-dien-21-oic acid, and

3β-hydroxy - 11 - keto - 16 - methylpregna - 5(6),16(17)-dien-21-oic acid for

3β-hydroxy-11 - keto - 5α-pregn-16(17)-en-21-oic acid in Example 1B above is productive of the 17α-iodolactones useful as intermediates in the production of the compounds of Formula 7b, namely, 3β,16β - dihydroxy - 16α - methyl - 17α - iodopregn-5(6)-en-21-oic acid γ-lactone, 3β,11β,16β - trihydroxy - 16α - methyl - 17α - iodopregn-5(6)-en-21-oic acid γ-lactone, and 3β,16β - dihydroxy - 11 - keto - 16α - methyl - 17α - iodopregn-5(6)-en-21-oic acid γ-lactone, respectively.

The substitution of bromine or chlorine for iodine and potassium bromide or potassium chloride for potassium iodide with the appropriate starting materials named following Example 1B is productive of the corresponding 17α-bromolactone or 17α-chlorolactone, respectively, e.g., 3 - keto - 16β - hydroxy - 17α - bromopregn - 4 - en - 21-oic acid γ-lactone, 3 - keto - 16β - hydroxy - 17α - chloropregn - 4 - en - 21-oic acid γ-lactone and 3 - keto - 6α - methyl - 11β,16β - dihydroxy - 17α - bromopregn-4-en-21-oic acid γ-lactone and 3 - keto - 6α - methyl - 11β,16β - dihydroxy - 17α - chloropregn-4-en-21-oic acid γ-lactone.

1C. 3β,16β-DIHYDROXY-11-KETO-5α-PREGN-17(20)-EN-21-OIC ACID γ-LACTONE 14.85 g. of 3β,16β-dihydroxy-11-keto-17α-iodo-5α-pregnan-21-oic acid γ-lactone dissolved in 50 ml. of pyridine was stirred at room temperature for approximately 3 days. The reaction mixture, comprising 3β,16β-dihydroxy-11-keto-5α-pregn-17(20)-en-21-oic acid γ-lactone, was diluted with methylene chloride and washed successively with dilute hydrochloric acid, sodium bicarbonate solution, and water, and dried over sodium sulfate. Removal of the solvent yielded a crystalline residue which was recrystallized from acetone-commercial hexanes to yield a first crop (8.5 g., melting point 259–264° C.) and a second crop (0.90 g., melting point 260–265° C.) of crystals comprising 3β,16β-dihydroxy-11-keto-5α-pregn-17(20)-en-21-oic acid γ-lactone. The two crops were combined and recrystallized from acetone-commercial hexanes to yield 3β,16β-dihydroxy - 11 - keto-5α-pregn-17(20)-en-21-oic acid γ-lactone having a melting point of 259–264° C., $\lambda_{max}^{EtOH}$ 216 m$\mu$, $a_M$ 13,300, infrared absorption bands (Nujol) at 3460, 1780, 1733, 1700, 1640, 1165, 1125, 1080, 1040, 1015 cm.$^{-1}$, and the following analysis:

*Analysis.*—Calcd .for $C_{21}H_{28}O_4$: C, 73.22; H, 8.19. Found: C, 73.02; H, 8.20.

Substituting 3β,16β-dihydroxy-11-keto-17α-bromo-5α-pregnan-21-oic acid γ-lactone or 3β,16β-dihydroxy-11-keto-17α-chloro-5α-pregnan-21-oic acid γ-lactone for 3β,16β-dihydroxy-11-keto-17α-iodo-5α-pregnan-21-oic acid γ-lactone is productive of 3β,16β-dihydroxy-11-keto-5α-pregn-17(20)-en-21-oic acid γ-lactone.

Similarly, substituting a stoichiometric equivalent amount of 3-keto-16β-hydroxy-17α-iodopregn-4-en-21-oic acid γ-lactone, 3-keto-16-hydroxy-17α-iodopregna-1,4-dien-21-oic acid γ-lactone, 3-keto-11β,16β-dihydroxy-17α-iodopregn-4-en-21-oic acid γ-lactone, 3-keto-11β,16β-dihydroxy-17α-iodogregna-1,4-dien-21-oic acid γ-lactone, 3,11-diketo-16β-hydroxy-17α-iodopregn-4-en-21-oic acid γ-lactone, 3,11-diketo-16β-hydroxy-17α-iodopregna-1,4-dien-21-oic acid γ-lactone, 3-keto-9α-fluoro-11β,16β-dihydroxy-17α-iodopregn-4-en-21-oic acid γ-lactone, 3-keto-9α-fluoro-11β,16β-dihydroxy-17α-iodopregna-1,4-dien-21-oic acid γ-lactone, 3,11-diketo-9α fluoro-16β-hydroxy-17α-iodopregn-4-en-21-oic acid γ-lactone, 3,11-diketo-9α-fluoro-16β-hydroxy-17α-iodopregna-1,4-dien-21-oic acid γ-lactone, 3-keto-16β-hydroxy-17α-iodopregna-4,9(11)-dien-21-oic acid γ-lactone, and 3-keto-16β-hydroxy-17α-iodopregna-1,4,9(11)-trien-21-oic acid γ-lactone, for 3β,16β - dihydroxy-11-keto-17α - iodo - pregnan-21-oic acid γ-lactons in Example 1C above is productive of the compounds of Formula 1, namely, 3-keto-16β-hydroxypregna-4,17(20)dien-21-oic acid γ-lactone, 3-keto-16β-hydroxypregna-1,4,17(20)-trien-21-oic acid γ-lactone, 3-keto-11β,16β-dihydroxypregna-4,17(20)-dien-21-oic acid γ-lactone, 3-keto-11β,16β-dihydroxypregna-1,4,17(20)-trien-21-oic acid γ-lactone, 3,11-diketo-16β-hydroxypregna-4,17(20)-dien-21-oic acid γ-lactone, 3,11-diketo-16β-hydroxypregna-1,4,17(20)-trien-21-oic acid γ-lactone, 3-keto-9α-fluoro-11β,16β-dihydroxypregna-4,17(20)-dien-21-oic acid γ-lactone, 3-keto-9α-fluoro-11β,16β-dihydroxypregna-1,4,17(20)-trien-21-oic acid γ-lactone, 3,11-diketo-9α-fluoro-16β-hydroxypregna-4,17(20)-dien-21-oic acid γ-lactone, 3,11-diketo-9α-fluoro-16β-hydroxypregna-1,4,17(20)-trien-21-oic acid γ-lactone, 3-keto-16β-hydroxypregna-4,9(11),17(20)-trien-21-oic acid γ-lactone, and 3-keto-16β-hydroxypregna-1,4,9(11),17(20)-tetraen-21-oic acid γ-lactone, respectively.

Similarly, substituting a stoichiometric equivalent amount of

2α-methyl-3-keto-11β,16β-dihydroxy-17α-iodopregn-4-en-21-oic acid γ-lactone,
2α-methyl-3,11-diketo-16β-hydroxy-17α-iodopregn-4-en-21-oic acid γ-lactone,
2α-methyl-3-keto-9α-fluoro-11β,16β-dihydroxy-17α-iodopregn-4-en-21-oic acid γ-lactone,
2α-methyl-3,11-diketo-9α-fluoro-16β-hydroxy-17α-iodopregn-4-en-21-oic acid γ-lactone, and
2α-methyl-3-keto-16β-hydroxy-17α-iodopregna-4,9(11)-dien-21-oic acid γ-lactone, for 3β,16β-dihydroxy-11-keto-17α-iodo-5α-pregnan-21-oic acid γ-lactone in Example 1C above is productive of the compounds of Formula 2a, namely, 2α-methyl-3-keto-11β,16β-dihydroxypregna-4,17(20)-dien-21-oic acid γ-lactone,
2α-methyl-3,11-diketo-16β-hydroxypregna-4,17(20)-dien-21-oic acid γ-lactone,
2α-methyl-3-keto-9α-fluoro-11β,16β-dihydroxypregna-4,17(20)-dien-21-oic acid γ-lactone,
2α-methyl-3,11-diketo-9α-fluoro-16β-hydroxypregna-4,17(20)-dien-21-oic acid γ-lactone, and
2α-methyl-3-keto-16β-hydroxypregna-4,9(11),17(20)-trien-21-oic acid γ-lactone, respectively.

Similarly, substituting a stoichiometric equivalent amount of 3-keto-6α-methyl-16β-hydroxy-17α-iodopregn-4-en-21-oic acid γ-lactone,
3-keto-6α-methyl-11β,16β-dihydroxy-17α-iodopregn-4-en-21-oic acid γ-lactone,
3-keto-6α-methyl-11β,16β-dihydroxy-17α-iodopregna-1,4-dien-21-oic-acid γ-lactone,
3,11-diketo-6α-methyl-16β-hydroxy-17α-iodopregn-4-en-21-oic acid γ-lactone,
3,11-diketo-6α-methyl-16β-hydroxy-17α-iodopregna-1,4-dien-21-oic acid γ-lactone,
3-keto-6α-methyl-9α-fluoro-11β,16β-dihydroxy-17α-iodopregn-4-en-21-oic acid γ-lactone,
3-keto-6α-methyl-9α-fluoro-11β,16β-dihydroxy-17α-iodopregna-1,4-dien-21-oic acid γ-lactone,
3,11-diketo-6α-methyl-9α-fluoro-16β-hydroxy-17α-iodopregn-4-en-21-oic acid γ-lactone,
3,11-diketo-6α-methyl-9α-fluoro-16β-hydroxy-17α-iodopregna-1,4-dien-21-oic acid γ-lactone,
3-keto-6α-methyl-16β-hydroxy-17α-iodopregna-4,9(11)-dien-21-oic acid γ-lactone, and
3-keto-6α-methyl-16β-hydroxy-17α-iodopregna-1,4,9(11)-trien-21-oic acid γ-lactone for 3β,16β-dihydroxy-11-keto-17α-iodo-5α-pregnan-21-oic acid γ-lactone in Example 1C above is productive of the compounds of Formula 2b, namely, 3-keto-6α-methyl-16β-hydroxypregna-4,17(20)-dien-21-oic acid γ-lactone,
3-keto-6α-methyl-11β,16β-dihydroxypregna-4,17(20)-dien-21-oic acid γ-lactone,
3-keto-6α-methyl-11β,16β-dihydroxypregna-1,4,17(20)-trien-21-oic acid γ-lactone,
3,11-diketo-6α-methyl-16β-hydroxypregna-4,17(20)-dien-21-oic acid γ-lactone,
3,11-diketo-6α-methyl-16β-hydrovypregna-1,4,17(20)-trien-21-oic acid γ-lactone,
3-keto-6α-methyl-9α-fluoro-11β,16β-dihydroxypregna-4,17(20)-dien-21-oic acid γ-lactone,
3-keto-6α-methyl-9α-fluoro-11β,16β-dihydroxypregna-1,4,17(20)-trien-21-oic acid γ-lactone,
3-11-diketo-6α-methyl-9α-fluoro-16β-hydroxypregna-4,17(20)-dien-21-oic acid γ-lactone,
3,11-diketo-6α-methyl-9α-fluoro-16β-hydroxypregna-1,4,17(20)-trien-21-oic acid γ-lactone,
3-keto-6α-methyl-16β-hydroxypregna-4,9(11),17(20)-trien-21-oic acid γ-lactone, and
3-keto-6α-methyl-16β-hydroxypregna-1,4,9(11),17(20)-tetraen-21-oic acid γ-lactone, respectively.

Similarly, substituting a stoichiometric aquivalent amount of 3-keto-11β,16β-dihydroxy-16α-methyl-17α-iodopregn-4-en-21-oic acid γ-lactone,
3-keto-11β,16β-dihydroxy-16α-methyl-17α-iodopregna-1,4-dien-21-oic acid γ-lactone,
3,11-diketo-16β-hydroxy-16α-methyl-17α-iodopregn-4-en-21-oic acid γ-lactone,
3,11-diketo-16β-hydroxy-16α-methyl-17α-iodopregna-1,4-dien-21-oic acid γ-lactone,
3-keto-9α-fluoro-11β,16β-dihydroxy-16α-methyl-17α-iodopregn-4-en-21-oic acid γ-lactone,
3-keto-9α-fluoro-11β,16β-dihydroxy-16α-methyl-17α-iodopregna-1,4-dien-21-oic acid γ-lactone,
3,11-diketo-9α-fluoro-16β-hydroxy-16α-methyl-17α-iodopregn-4-en-21-oic acid γ-lactone,
3,11-diketo-9α-fluoro-16β-hydroxy-16α-methyl-17α-iodopregna-1,4-dien-21-oic acid γ-lactone,
3-keto-16β-hydroxy-16α-methyl-17α-iodopregna-4,9(11)-dien-21-oic acid γ-lactone, and
3-keto-16β-hydroxy-16α-methyl-17α-iodopregna-1,4,9(11)-trien-21-oic acid γ-lactone for 3β,16β-dihydroxy-11-keto-17α-iodo-5α-pregnan-21-oic acid γ-lactone in Example 1C above is productive of the compounds of Formula 2c, namely, 3-keto-11β,16β-dihydroxy-16α-methylpregna-4,17(20)-dien-21-oic acid γ-lactone,
3-keto-11β,16β-dihydroxy-17α-methylpregna-1,4,17(20)-trien-21-oic acid γ-lactone,
3,11-diketo-16β-hydroxy-16α-methylpregna-4,17(20)-dien-21-oic acid γ-lactone,
3,11-diketo-16β-hydroxy-16α-methylpregna-1,4,17(20)-trien-21-oic acid γ-lactone,
3-keto-9α-fluoro-11β,16β-dihydroxy-16α-methylpregna-4,17(20)-dien-21-oic acid γ-lactone,
3-keto-9α-fluoro-11β,16β-dihydroxy-16α-methylpregna-1,4,17(20)-trien-21-oic acid γ-lactone,
3,11-diketo-9α-fluoro-16β-hydroxy-16α-methylpregna-4,17(20)-dien-21-oic acid γ-lactone,
3,11-diketo-9α-fluoro-16β-hydroxy-16α-methylpregna-1,4,17(20)-trien-21-oic acid γ-lactone,
3-keto-16β-hydroxy-16α-methylpregna-4,9(11),17(20)-trien-21-oic acid γ-lactone, and
3-keto-16β-hydroxy-16α-methylpregna-1,4,9(11,17(20)-tetraen-21-oic acid γ-lactone, respectively.

Similarly, substituting a stoichiometric equivalent amount of 3-keto-11α,16β-dihydroxy-17α-iodopregn-4-en-21-oic acid γ-lactone and
3-keto-11α,16β-dihydroxy-17α-iodopregna-1,4-dien-21-oic acid γ-lactone for 3β,16β-dihydroxy-11-keto-17α-iodo-5α-pregnan-21-oic acid γ-lactone in Example 1C above is producive of the compounds of Formula (3), namely, 3-keto-11α,16β-dihydroxypregna-4,17(20)-dien-21-oic acid γ-lactone and
3-keto-11α,16β-dihydroxypregna-1,4,17(20)-trien-21-oic acid γ-lactone, respectively.

Similarly, substituting a stoichiometric equivalent amount of

3β,16β-dihydroxy-17α-iodo-5α-pregnan-21-oic acid γ-lactone,
3β,11β,16β-trihydroxy-17α-iodo-5α-pregnan-21-oic acid γ-lactone and
3β,11α,16β-trihydroxy-17α-iodo-5α-pregnan-21-oic acid γ-lactone for 3β,16β-dihydroxy-11-keto-17α-iodo-5α-pregnan-21-oic acid γ-lactone in Example 1C above is productive of the compounds of Formula 4a wherein R is hydrogen, namely, 3β,16β-dihydroxy-5α-pregn-17(20)-en-21-oic acid γ-lactone, and 3β,11α,16β-trihydroxy-5α-pregn-17(20)-en-21-oic acid γ-lactone, respectively.

Similarly, substituting a stoichiometric equivalent amount of

3α,16β-dihydroxy-17α-iodo-5β-pregnan-21-oic acid γ-lactone,
3α,11β,16β-trihydroxy-17α-iodo-5β-pregnan-21-oic acid γ-lactone,
3α,16β-dihydroxy-11-keto-17α-iodo-5β-pregnan-21-oic acid γ-lactone, and
3α,11α,16β-trihydroxy-17α-iodo-5β-pregnan-21-oic acid γ-lactone for
3β,16β-dihydroxy-11-keto-17α-iodo-5α-pregnan-21-oic acid γ-lactone in Example 1C above is productive of the compounds of Formula 4b wherein R is hydrogen, namely,
3α,16β-dihydroxy-5β-pregn-17(20)-en-21-oic acid γ-lactone,
3α,11β,16β-trihydroxy-5β-pregn-17(20)-en-21-oic acid γ-lactone,
3α,16β-dihydroxy-11-keto-5β-pregn-17(20)-en-21-oic acid γ-lactone, and
3α,11α,16β-trihydroxy-5β-pregn-17(20)-en-21-oic acid γ-lactone, respectively.

Similarly, substituting a stoichiometric equivalent amount of

3β,11β,16β-trihydroxy-16α-methyl-17α-iodo-5α-pregnan-21-oic acid γ-lactone and
3β,16β-dihydroxy-11-keto-16α-methyl-17α-iodo-5α-pregnan-21-oic acid γ-lactone for 3β,16β-dihydroxy-11-keto-17α-iodo-5α-pregnan-21-acid γ-lactone in Example 1C above is productive of the compounds of Formula 5a wherein R is hydrogen, namely,
3β,11β,16β-trihydroxy-16α-methyl-5α-pregn-17(20)-en-21-oic acid γ-lactone and
3β,16β-dihydroxy-11-keto-16α-methyl-5α-pregn-17(20)-en-21-oic acid γ-lactone, respectively.

Similarly, substituting a stoichiometric equivalent amount of

3α,11β,16β-trihydroxy-16α-methyl-17α-iodo-5β-pregnan-21-oic acid γ-lactone and
3α,16β-dihydroxy-11-keto-16α-methyl-17α-iodo-5β-pregnan-21-oic acid γ-lactone for 3β,16β-dihydroxy-11-keto-17α-iodo-5α-pregnan-21-oic acid γ-lactone in Example 1C above is productive of the compounds of Formula 5b wherein R is hydrogen, namely,
3α,11β,16β-trihydroxy-16α-methyl-5β-pregn-17(20)-en-21-oic acid γ-lactone and
3α,16β-dihydroxy-11-keto-16α-methyl-5β-pregn-17(20)-en-21-oic acid γ-lactone, respectively.

Similarly, substituting a stoichiometric equivalent amount of

3β,16β-dihydroxy-17α-iodopregn-5(6)-en-21-oic acid γ-lactone,
3β,11β,16β-trihydroxy-17α-iodopregn-5(6)-en-21-oic acid γ-lactone,
3β,16β-dihydroxy-11-keto-17α-iodopregn-5(6)-en-21-oic acid γ-lactone, and
3β,11α,16β-trihydroxy-17α-iodopregn-5(6)-en-21-oic acid γ-lactone for 3β,16β-dihydroxy-11-keto-17α-iodo-5α-pregnan-21-oic acid γ-lactone in Example 1C above is productive of the compounds of Formula 6 wherein R is hydrogen, namely,
3β,16β-dihydroxypregna-5(6),17(20)-dien-21-oic acid γ-lactone,
3β,11β,16β-trihydroxypregna-5(6),17(20)-dien-21-oic acid γ-lactone,
3β,16β-dihydroxy-11-ketopregna-5(6),17(20)-dien-21-oic acid γ-lactone, and
3β,11α,16β-trihydroxypregna-5(6),17(20)-dien-21-oic acid γ-lactone, respectively.

Similarly, substituting a stoichiometric equivalent amount of

3β,16β-dihydroxy-6-methyl-17α-iodopregn-5(6)-en-21-oic acid γ-lactone,
3β,11β,16β-trihydroxy-6-methyl-17α-iodopregn-5(6)-en-21-oic acid γ-lactone, and
3β,16β-dihydroxy-6-methyl-11-keto-17α-iodopregn-5(6)-en-21-oic acid γ-lactone for
3β,16β-dihydroxy-11-keto-17α-iodo-5α-pregnan-21-oic acid γ-lactone in Example 1C above is productive of the compounds of Formula 7a wherein R is hydrogen, namely,
3β,16β-dihydroxy-6-methylpregna-5(6),17(20)-dien-21-oic acid γ-lactone,
3β,11β,16β-trihydroxy-6-methylpregna-5(6),17(20)-dien-21-oic acid γ-lactone, and
3β,16β-dihydroxy-6-methyl-11-ketopregna-5(6),17(20)-dien-21-oic acid γ-lactone, respectively.

Similarly, substituting a stoichiometric equivalent amount of

3β,16β-dihydroxy-16α-methyl-17α-iodopregn-5(6)-en-21-oic acid γ-lactone,
3β,11β,16β-trihydroxy-16α-methyl-17α-iodopregn-5(6)-en-21-oic acid γ-lactone and
3β,16β-dihydroxy-11-keto-16α-methyl-17α-iodopregn-5(6)-en-21-oic acid γ-lactone for
3β,16β-dihydroxy-11-keto-17α-iodo-5α-pregnan-21-oic acid γ-lactone in Example 1C above is productive of the compounds of Formula 7b wherein R is hydrogen, namely,
3β,16β-dihydroxy-16α-methylpregna-5(6),17(20)-dien-21-oic acid γ-lactone,
3β,11β,16β-trihydroxy-16α-methylpregna-5(6),17(20)-dien-21-oic acid γ-lactone, and
3β,16β-dihydroxy-11-keto-16α-methylpregna-5(6),17(20)-dien-21-oic acid γ-lactone, respectively.

Substituting the corresponding 17α-bromolactones or 17α-chlorolactones for the 17α-iodolactones named above is productive of the respective $\Delta^{17(20)}$ lactones named above. Thus, for example, the substitution of 3-keto-16β-hydroxy-17α-bromopregn-4-en-21-oic acid γ-lactone or 3-keto-16β-hydroxy-17α-chloropregn-4-en-21-oic acid γ-lactone for 3-keto-16β-hydroxy-17α-iodopregn-4-en-21-oic acid γ-lactone is productive of 3-keto-16β-hydroxypregna-4,17(20)-dien-21-oic acid γ-lactone and the substitution of 3-keto-6α-methyl-11β,16β-dihydroxy-17α-bromopregn-4-en-21-oic acid γ-lactone or
3-keto-6α-methyl-11β,16β-dihydroxy-17α-chloropregn-4-en-21-oic acid γ-lactone for
3-keto-6α-methyl-11β,16β-dihydroxy-17α-iodopregn-4-en-21-oic acid γ-lactone is productive of 3-keto-6α-methyl-11β,16β-dihydroxypregna-4,17(20)-dien-21-oic acid γ-lactone.

1D. 3β-ACETOXY-16β-HYDROXY-11-KETO-5α-PREGN-17(20)-EN-21-OIC ACID γ-LACTONE

A mixture of 1 g. of 3β,16β-dihydroxy-11-keto-5α-pregn-17(20)-en-21-oic acid γ-lactone, 2 ml. of acetic anhydride and 100 ml. of pyridine was stirred and then allowed to stand at room temperature for approximately 18 hours. The reaction mixture was then poured into ice:water and the crystalline material comprising 3β-acetoxy-16β-hydroxy-11-keto-5α-pregn-17(20)-en-21-oic acid γ-lactone which had formed was removed by filtration, washed with water and dried in vacuo. The crystalline material was then recrystallized from acetone:commercial hexanes to give 0.63 g. of product comprising 3β-acetoxy-16β-hydroxy-11-keto-5α-pregn-17(20)-en-21-oic acid γ-lactone having a melting point of 235–240° C. Two further recrystallizations from acetone:commercial hexanes yielded 3β-acetoxy-16β-hydroxy-11-keto-5α-pregn-17(20)-en-21-oic acid γ-lactone having a melting point of 255–258° C., infrared absorption bands (Nujol) at 1780, 1735, 1710, 1645, 1240, 1160, 1020, and 1010 cm.$^{-1}$ and an ultraviolet analysis of $$\lambda_{max.}^{EtOH} \ 217 \ m\mu, \ \epsilon \ 14,350$$

and the following analysis:

Analysis.—Calcd. for $C_{23}H_{30}O_5$: C, 71.48; H, 7.82. Found: C, 71.43; H, 7.94.

Similarly, by reacting the appropriate hydrocarbon carboxylic acid anhydride such as these given in the penultimate paragraph of the body of the disclosure, with 3β,16β-dihydroxy-11-keto-5α-pregn-17(20)-en-21-oic acid γ-lactone, is productive of other 3-acyloxy derivatives.

Similarly, reacting

3β,16β-dihydroxy-5α-pregn-17(20)-en-21-oic acid γ-lactone,

3β,11β,16β-trihydroxy-5α-pregn-17(20)-en - 21 - oic acid γ-lactone, and

3β,11α,16β-trihydroxy-5α-pregn-17(20)-en - 21 - oic acid γ-lactone with acetic anhydride (or with other hydrocarbon carboxylic anhydrides, such as those given in the penultimate paragraph of the body of the disclosure), according to the procedure of Example 1D, is productive of the corresponding 3-esters of the compounds of Formula 4a, namely, 3β - acetoxy (acyloxy)-16β-hydroxy-5α-pregn-17(20)-en-21-oic acid γ-lactone, 3β - acetoxy (acyloxy) - 11β,16β - dihydroxy - 5α - pregn-17(20)-en-21-oic acid γ-lactone, and 3β,11α-diacetoxy (diacyloxy) - 16β - hydroxy - 5α - pregn-17(20)-en-21-oic acid γ-lactone, respectively.

Similarly, reacting

3α,16β-dihydroxy-5β-pregn-17(20)-en-21-oic acid γ-lactone,

3α,11β,16β-trihydroxy-5β-pregn-17(20) - en - 21 - oic acid γ-lactone,

3α,16β-dihydroxy-11-keto-5β-pregn-17(20)-en-21-oic acid γ-lactone, and

3α,11α,16β-trihydroxy-5β-pregn-17(20)-en - 21 - oic acid γ-lactone with acetic anhydride (or with other hydrocarbon carboxylic anhydrides, such as those given in the penultimate paragraph of the body of the disclosure), according to the procedure of Example 1D, is productive of the corresponding 3-esters of the compounds of Formula 4b, namely, 3α-acetoxy (acyloxy)-16β-hydroxy-5β-pregn - 17(20)-en-21-oic acid γ-lactone, 3α - acetoxy (acyloxy) - 11β,16β - dihydroxy - 5β - pregn-17(20)-en-21-oic acid γ-lactone, 3α-acetoxy (acyloxy)-16β-hydroxy-11 - keto - 5β - pregn-17(20)-en-21-oic acid γ-lactone, and 3α,11α-diacetoxy (diacyloxy)-16β - hydroxy - 5β - pregn-17(20)-en-21-oic acid γ-lactone, respectively.

Similarly, reacting

3β,11β,16β-trihydroxy-16α-methyl-5α - pregn - 17(20)-en-21-oic acid γ-lactone, and 3β,16β-dihydroxy-11-keto-16α-methyl - 5α - pregn-17(20)-en-21-oic acid γ-lactone
with acetic anhydride (or with other hydrocarbon carboxylic anhydrides, such as those given in the penultimate paragraph of the body of the disclosure), according to the procedure of Example 1D, is productive of the corresponding 3-esters of the compounds of Formula 5a, namely, 3β-acetoxy (acyloxy)-11β,16β-dihydroxy-16α-methyl - 5α-pregn-17(20)-en-21-oic acid γ-lactone, and 3β-acetoxy (acyloxy)-16β-hydroxy-11-keto-16α - methyl-5α-pregn-17(20)-en-21-oic acid γ-lactone, respectively.

Similarly, reacting

3β,11β,16β-trihydroxy-16α-methyl-5β-pregn - 17(20) - en-21-oic acid γ-lactone and 3β,16β-dihydroxy-11-keto-16α-methyl-5β - pregn - 17(20)-en-21-oic acid γ-lactone
with acetic anhydride (or with other hydrocarbon carboxylic anhydrides, such as those given in the penultimate paragraph of the body of the disclosure), according to the procedure of Example 1D, is productive of the corresponding 3-esters of the compounds of Formula 5b, namely, 3β-acetoxy (acyloxy)-11β,16β-dihydroxy - 16α - methyl-5β-pregn-17(20)-en-21-oic acid γ-lactone and 3β-acetoxy (acyloxy)-16β-hydroxy-11-keto-16α - methyl-5β-pregn-17(20)-en-21-oic acid γ-lactone, respectively.

Similarly, reacting

3β-16β-dihydroxypregna-5(6),17(20) - dien - 21 - oic acid γ-lactone,

3β-11β-16β-trihydroxypregna-5(6),17(20) - dien - 21 - oic acid γ-lactone,

3β-16β-dihydroxy-11-ketopregna-5(6),17(20) - dien - 21-oic acid γ-lactone, and

3β-11α,16β-trihydroxypregna-5(6),17(20) - dien - 21 - oic acid γ-lactone with acetic anhydride (or with other hydrocarbon carboxylic anhydrides, such as those given in the penultimate paragraph of the body of the disclosure), according to the procedure of Example 1D, is productive of the corresponding 3-esters of the compounds of Formula 6, namely, 3β-acetoxy (acyloxy) - 16β - hydroxypregna-5(6),17(20)-dien-21-oic acid γ-lactone, 3β-hydroxy (acyloxy)-11β - 16β - dihydroxypregna - 5(6),17(20)-dien-21-oic acid γ-lactone, 3β - acetoxy (acyloxy)-16β-hydroxy-11-ketopregna-5(6),17(20)-dien-21-oic acid γ-lactone, and 3β-11α-diacetoxy (diacyloxy)-16β-hydroxypregna - 5(6),17(20)-dien-21-oic acid γ-lactone, respectively.

Similarly, reacting

3β-16β-dihydroxy - 6 - methylpregna - 5(6),17(20)-dien-21-oic acid γ-lactone,

3β,11β,16β - trihydroxy - 6 - methylpregna - 5(6),17(20)-dien-21-oic acid γ-lactone, and 3β-16β-dihydroxy-6-methyl-11-ketopregna - 5(6),17(20)-dien-21-oic acid γ-lactone.
with acetic anhydride (or with other hydrocarbon carboxylic anhydrides, such as those given in the penultimate paragraph of the body of the disclosure), according to the procedure of Example 1D, is productive of the corresponding 3-esters of the compounds of Formula 7a, namely, 3β - acetoxy (acyloxy) - 16β - hydroxy - 6 - methylpregna-5(6),17(20)-dien-21-oic acid γ-lactone, 3β - acetoxy (acyloxy) - 11β,16β - dihydroxy - 6 - methylpregna-5(6),17(20)-dien-21-oic acid γ-lactone, and 3β-acetoxy (acyloxy)-16β-hydroxy - 6 - methyl - 11 - ketopregna-5(6),17(20)-dien-21-oic acid γ-lactone, respectively.

Similarly, reacting

3β,16β-dihydroxy-16α-methylpregna-5(6),17(20)-dien-21-oic acid γ-lactone,

3β,11β,16β-trihydroxy-16α-methylpregna-5(6),17(20)-dien-21-oic acid γ-lactone,

3β,16β-dihydroxy-11-keto-16α-methylpregna-5(6),17(20)-dien-21-oic acid γ-lactone
with acetic anhydride (or with other hydrocarbon carboxylic anhydrides, such as those given in the penultimate paragraph of the body of the disclosure), according to the procedure of Example 1D, is productive of the corresponding 3-esters of the compounds of Formula 7b, namely, 3β-acetoxy (acyloxy)-16β-hydroxy-16α-methylpregna-5(6),17(20)-dien-21-oic acid γ-lactone, 3β-acetoxy (acyloxy)-11β,16β-dihydroxy-16α-methylpregna-5(6),17(20)-dien-21-oic acid γ-lactone, and 3β - acetoxy (acyloxy)-16β-hydroxy-11-keto-16α-methylpregna-5(6),17(20)-dien-21-oic acid γ-lactone, respectively.

EXAMPLE 2

*3,11-Diketo-16β-Hydroxypregna-1,4,17(20)-Trien-21-Oic Acid γ-Lactone*

2A. 3,11-DIKETOPREGNA-1,4,16(17)-TRIEN-21-OIC ACID

A suspension of 29.6 g. of methyl 3,11-diketopregna-1,4,17(20)-trien-21-oate in 500 ml. of methanol and a solution of 30.0 g. of potassium hydroxide in 100 ml. of water was refluxed under nitrogen for about 3 hours. Following reflux most of the methanol was removed in vacuo from the reaction mixture, comprising 3,11-diketopregna-1,4,16(17)-trien-21-oic acid, leaving a residual brown solution which was boiled with approximately 2.0 g. of activated charcoal (Darco G), filtered through diatomaceous earth (Celite) and extracted with methylene chloride. The aqueous layer remaining, following the methylene chloride extraction, was acidified and extracted with several portions of ethyl acetate. The ethyl acetate extracts were combined, washed with water and with two 500 ml. portions of saturated sodium bicarbonate solution. The sodium bicarbonate solutions comprising 3,11-diketopregna-1,4,16(17)-trien-21-oic acid were used without further treatment in part 2B.

2B. 3,11-DIKETO-16β-HYDROXY-17α-IODOPREGNA-1,4-DIEN-21-OIC ACID γ-LACTONE

The sodium bicarbonate solutions obtained in part 2A were combined and added to a solution of 29.6 g. of iodine and 40.0 g. of potassium iodide in 500 ml. of water. The reaction mixture was allowed to stand for approximately 18 hours at about room temperature, followed by extraction with ethyl acetate:methylene chloride (1:1). The organic extract, comprising 3,11-diketo-16β-hydroxy-17α-iodopregna-1,4-dien-21-oic acid γ-lactone, was washed successively with sodium thiosulfate solution, saturated aqueous sodium bicarbonate, and water, and dried over sodium sulfate. The solvent was then removed from the dried solution leaving a residue which was triturated with ether-methanol. Removal of the ether-methanol yielded 2.4 g. of crystalline material comprising 3,11-diketo-16β-hydroxy-17α-iodopregna-1,4-dien-21-oic acid γ-lactone and having a melting point of 205° C. (dec.).

2C. 3,11-DIKETO-16β-HYDROXYPREGNA-1,4,17(20)-TRIEN-21-OIC ACID γ-LACTONE 2.0 g. of the crystalline material comprising 3,11-diketo-16β-hydroxy-17α-iodopregna-1,4-dien-21-oic acid γ-lactone, obtained in part 2B, suspended in 20 ml. of pyridine was stirred for approximately 3 days at about room temperature. The reaction mixture, comprising 3,11-diketo-16β-hydroxypregna-1,4,17(20)-trien-21-oic acid γ-lactone, was diluted with water and extracted with several portions of methylene chloride. The methylene chloride extracts were combined, washed successively with ice cold dilute hydrochloric acid, sodium bicarbonate solution and water, and dried over sodium sulfate. The oil obtained upon removal of the solvent was dissolved in 20 ml. of methylene chloride and poured onto a chromatographic column containing 100 g. of Florisil (synthetic magnesium silicate) packed wet in commercial hexanes. The chromatographic column was developed by eluting with commercial hexanes containing increasing amounts of acetone. The eluate fractions were freed of solvent and those fractions which infrared analysis and paper chromatography showed to contain the desired product, namely, those fractions eluted with 25-40 percent acetone:75-60 percent commercial hexanes, were combined and recrystallized from methanol to give a first crop (0.45 g.) and a second crop (0.34 g.) of crystals comprising 3,11-diketo-16β-hydroxypregna-1,4,17(20)-trien-21-oic acid γ-lactone, both crops having a melting point of 216-219° C. The first crop (0.47 g.) was recrystallized from acetone-commercial hexanes to yield an analytical sample of 3,11-diketo-16β-hydroxypregna-1,4,17(20)-trien-21-oic acid γ-lactone having a melting point of 218-220° C., $$\lambda_{max.}^{EtOH}\ 228\ m\mu,\ a_M\ 22,300$$

infrared absorption bands (Nujol) at 1770, 1745, 1710, 1670, 1630, 1610, 1235, 1155, 1120 and 1070 cm.$^{-1}$, and the following analysis:

*Analysis.*—Calcd. for $C_{21}H_{22}O_4$: C, 74.53; H, 6.55. Found: C, 74.53; H, 6.81.

EXAMPLE 3

*3,11-Diketo-16β-Hydroxypregna-4,17(20)-Dien-21-Oic Acid γ-Lactone*

3A. 3,11-DIKETO-16β-HYDROXY-17α-IODOPREGN-4-EN-21-OIC ACID γ-LACTONE

A solution containing 45.5 g. of 3,11-diketopregna-4,16(17)-dien-21-oic acid in aqueous potassium bicarbonate (30 g. of potassium bicarbonate in 1200 ml. of water) was added with stirring to a solution of 160 g. of iodine and 300 g. of potassium iodide in 2400 ml. of water. The reaction mixture, comprising 3,11-diketo-16β-hydroxy-17α-iodopregn-4-en-21-oic acid γ-lactone, was allowed to stand at about room temperature for approximately 4.5 hours and then extracted with several portions of ethyl acetate. The combined ethyl acetate extracts were washed successively with sodium thiosulfate solution, sodium bicarbonate solution, and water, and dried over sodium sulfate. The solvent was then removed to give a residue which was crystallized from acetone-commercial hexanes to yield a first crop of crystals weighing 30.5 g. and having a melting point of 195-205° C. (dec.) and a second crop of crystals weighing 3.5 g. The first and second crops were combined. A sample of the iodolactone which was recrystallized from acetone-commercial hexanes gave an analytical sample of 3,11-diketo-16β-hydroxy-17α-iodopregna-4-en-21-oic acid γ-lactone having a melting point of 218-221° C. (dec.), $$\lambda_{max.}^{EtOH}\ 237.5\ m\mu,\ a_M\ 16,650$$

infrared absorption bands (Nujol) at 1773, 1708, 1665, 1618, 1200, 1177, 1170, 1045 and 1028 cm.$^{-1}$ and the following analysis:

*Analysis.*—Calcd. for $C_{21}H_{25}O_4I$: C, 53.86; H, 5.3; I, 27.1. Found: C, 54.13; H, 5.94; I, 27.4.

3B. 3,11-DIKETO-16β-HYDROXYPREGNA-4,17(20)-DIEN-21-OIC ACID γ-LACTONE

A solution of 34.0 g. of 3,11-diketo-16β-hydroxy-17α-iodopregn-4-en-21-oic acid γ-lactone in 200 ml. of pyridine was stirred at about room temperature for approximately 60 hours. The reaction mixture, comprising 3,11-diketo-16β-hydroxypregna-4,17(20)-dien-21-oic acid γ-lactone, was extracted with methylene chloride and the methylene chloride extract was washed successively with water, dilute hydrochloric acid, sodium bicarbonate solution, again with water, and dried over sodium sulfate. The crystalline residue remaining upon removal of the solvent was dissolved in methylene chloride and poured onto a chromatographic column containing 1500 g. of Florisil (synthetic magnesium silicate) packed wet in commercial hexanes. The chromatographic column was developed by eluting with commercial hexanes containing increasing amounts of acetone. The eluate fractions were freed of solvent and those fractions which infrared analysis and paper chromatography showed to contain the desired product, namely, those eluted with the 50 percent acetone-50 percent commercial hexanes, were combined and recrystallized from acetone-commercial hexanes to give a first crop (14.7 g., melting point 235-238° C.) and a second crop (3.95 g., melting point 228-233° C.) of crystals comprising 3,11-diketo-16β-hydroxypregna-4,17(20)-dien-21-oic acid γ-lactone. An analytical sample of 3,11-diketo-16β - hydroxypregna-4,17(20)-dien-21-oic acid γ-lactone had a melting point of 229–236° C., $\lambda_{max.}^{EtOH}$ 230 mμ, $a_M$ 22,500 infrared absorption bands (Nujol) at 1770, 1753, 1743, 1697, 1663, 1635, 1605, 1247, 1233, 1175, 1163, 1133, and 1085 cm.$^{-1}$, and the following analysis:

*Analysis.*—Calcd. for $C_{21}H_{24}O_4$: C, 74.09; H, 7.11. Found: C, 73.96; H, 7.30.

I claim:

1. A compound of the formula:

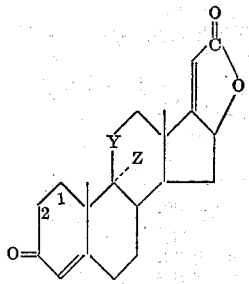

wherein the 1,2-carbon atom linkage is selected from the group consisting of single and double bond linkages, Y is selected from the group consisting of methylene (>CH$_2$), β-hydroxymethylene

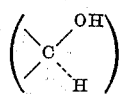

and carbonyl (>C=O), Z is selected from the group consisting of hydrogen and fluorine, and Y and Z can together constitute a 9(11)-double bond.

2. A compound selected from the group consisting of compounds of the following formulae:

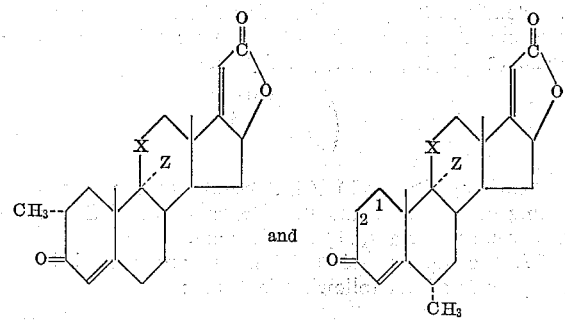

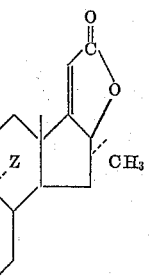

wherein the 1,2-carbon atom linkage is selected from the group consisting of single and double bond linkages, X is selected from the group consisting of β-hydroxymethylene

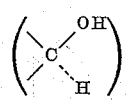

and carbonyl (>C=O), and Z is selected from the group consisting of hydrogen and fluorine, and X and Z can together constitute a 9(11)-double bond.

3. A compound of the formula:

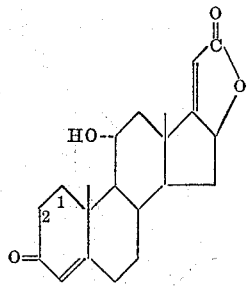

wherein the 1,2-carbon atom linkage is selected from the linkages consisting of single and double bond linkages.

4. A compound selected from the group consisting of compounds of the following formulae:

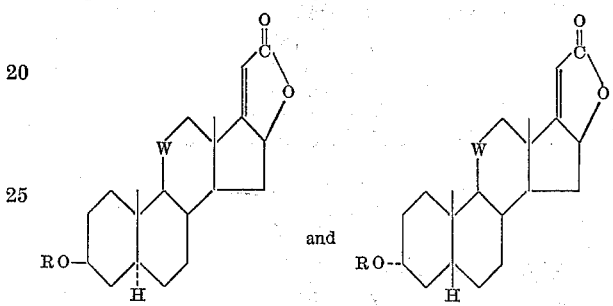

wherein R is selected from the group consisting of hydrogen and the acyl radical of a hydrocarbon carboxylic acid containing from 1 to 12 carbon atoms, inclusive, and W is selected from the group consisting of methylene (>CH$_2$), β-hydroxymethylene

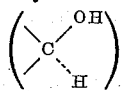

carbonyl (>C=O), and α-hydroxymethylene

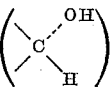

and α-acyloxymethylene

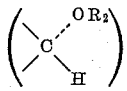

R$_2$ being the acyl radical of a hydrocarbon carboxylic acid containing from 1 to 12 carbon atoms, inclusive, provided that R$_2$ is the same as R when R is an acyl radical.

5. A compound selected from the group consisting of compounds of the following formulae:

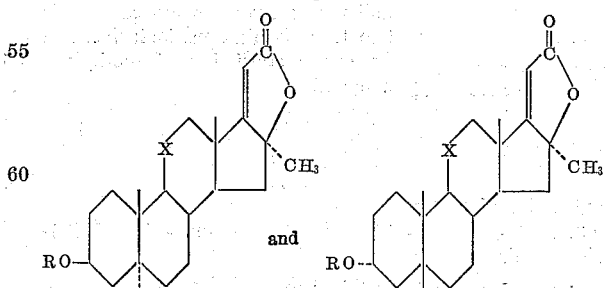

wherein R is selected from the group consisting of hydrogen and the acyl radical of a hydrocarbon carboxylic acid containing from 1 to 12 carbon atoms, inclusive, and X is selected from the group consisting of β-hydroxymethylene

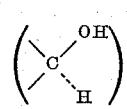

and carbonyl (>C=O).

6. A compound of the formula:

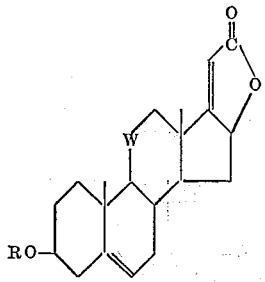

wherein R is selected from the group consisting of hydrogen and the acyl radical of a hydrocarbon carboxylic acid containing from 1 to 12 carbon atoms, inclusive, and W is selected from the group consisting of methylene (>$CH_2$), β-hydroxymethylene

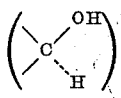

carbonyl (>C=O) and α-hydroxymethylene

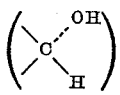

and α-acyloxymethylene

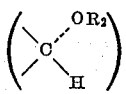

$R_2$ being the acyl radical of a hydrocarbon carboxylic acid containing from 1 to 12 carbon atoms, inclusive, provided that $R_2$ is the same as R when R is an acyl radical.

7. A compound selected from the group consisting of compounds of the following formulae:

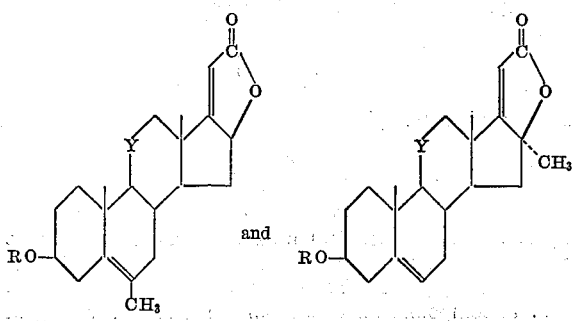

wherein R is selected from the group consisting of hydrogen and the acyl radical of a hydrocarbon carboxylic acid containing from 1 to 12 carbon atoms, inclusive, and Y is selected from the group consisting of methylene (>$CH_2$), β-hydroxymethylene

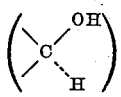

and carbonyl (>C=O).

8. 3,11 - diketo - 16β - hydroxypregna - 1,4,17(20)-trien-21-oic acid γ-lactone.

9. 3,11 - diketo - 16β - hydroxypregna - 4,17(20)-dien-21-oic acid γ-lactone.

10. 3 - keto - 16β - hydroxypregna - 1,4,17(20)-trien-21-oic acid γ-lactone.

11. 3 - keto - 16β - hydroxypregna-4,17(20)-dien-21-oic acid γ-lactone.

12. 3,11 - diketo - 9α - fluoro-16β-hydroxypregna-4,17(20)-dien-21-oic acid γ-lactone.

13. 3-keto-9α-fluoro - 11β,16β - dihydroxypregna-4,17(20)-dien-21-oic acid γ-lactone.

14. 3-keto-6α-methyl - 16β - hydroxypregna-4,17(20)-dien-21-oic acid γ-lactone.

15. 3,11-diketo-6α-methyl - 16β - hydroxypregna-4,17(20)-dien-21-oic acid γ-lactone.

16. 3-keto-6α-methyl - 9α - fluoro-11β,16β-dihydroxypregna-4,17(20)-dien-21-oic acid γ-lactone.

17. 3-keto-11α,16β-dihydroxypregna - 4,17(20) - dien-21-oic acid γ-lactone.

18. 3β,16β-dihydroxy - 11 - keto-5α-pregn-17(20)-en-21-oic acid γ-lactone.

19. 3α,16β-dihydroxy - 11 - keto-5β-pregn-17(20)-en-21-oic acid γ-lactone.

20. 3β,16β-dihydroxy - 5α - pregn-17(20)-en-21-oic acid γ-lactone.

21. 3α,16β - dihydroxy-5β-pregn - 17(20) - en-21-oic acid γ-lactone.

22. 3β,16β-dihydroxy - 11 - ketopregna-5(6),17(20)-dien-21-oic acid γ-lactone.

23. 3β,16β - dihydroxypregna-5(6),17(20)-dien-21-oic acid γ-lactone.

24. 3β,16β-dihydroxy - 6 - methylpregna-5(6),17(20)-dien-21-oic acid γ-lactone.

25. 3β,16β - dihydroxy-16α-methylpregna-5(6),17(20)-dien-21-oic acid γ-lactone.

26. A compound of the formula:

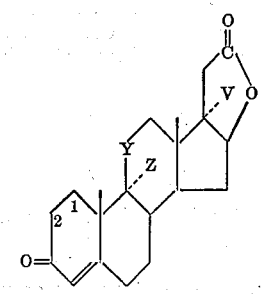

wherein the 1,2-carbon atom linkage is selected from the group consisting of single and double bond linkages, V is selected from the group consisting of iodine, bromine and chlorine, Y is selected from the group consisting of methylene (>$CH_2$), β-hydroxymethylene

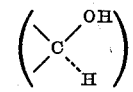

and carbonyl (>C=O), Z is selected from the group consisting of hydrogen and fluorine, and Y and Z can together constitute a 9(11)-double bond.

27. A compound selected from the group consisting of compounds of tha following formulae:

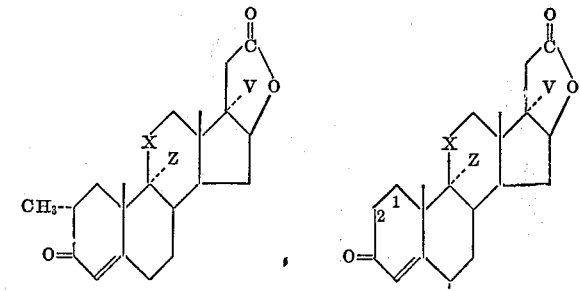

and

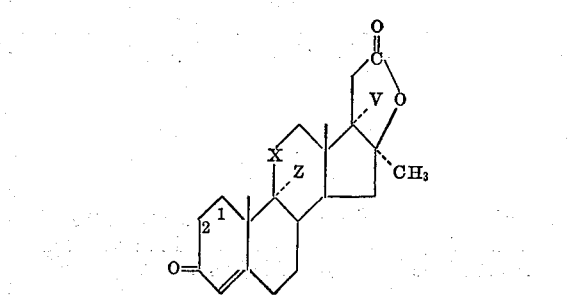

wherein the 1,2-carbon atom linkage is selected from the group consisting of single bond and double bond linkages, V is selected from the group consisting of iodine, bromine, and chlorine, X is selected from the group consisting of β-hydroxymethylene

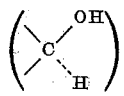

and carbonyl (>C=O), and Z is selected from the group consisting of hydrogen and fluorine, and X and Z can together constitute a 9(11)-double bond.

28. A compound of the formula:

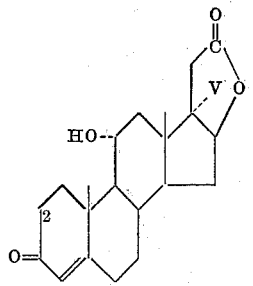

wherein the 1,2-carbon atom linkage is selected from the linkages consisting of single and double bond linkages and V is selected from the group consisting of iodine, bromine and chlorine.

29. A compound selected from the group consisting of compounds of the following formulae:

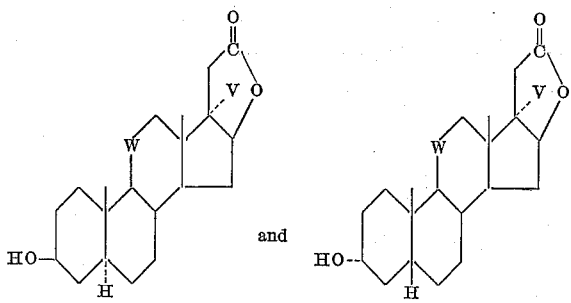

wherein V is selected from the group consisting of iodine, bromine and chlorine, and W is selected from the group consisting of methylene (>CH$_2$), β-hydroxymethylene

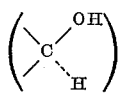

carbonyl (>C=O), and α-hydroxymethylene

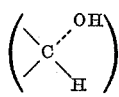

30. A compound selected from the group consisting of compounds of the following formulae:

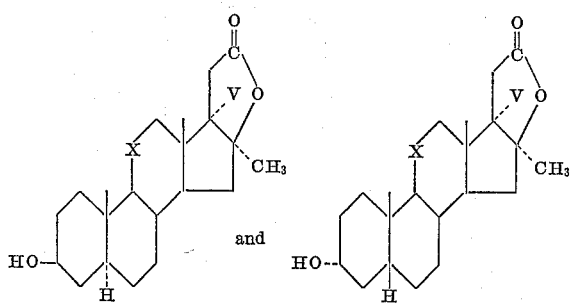

wherein V is selected from the group consisting of iodine, bromine, and chlorine, and X is selected from the group consisting of β-hydroxymethylene

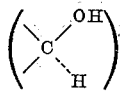

and carbonyl (>C=O).

31. A compound of the formula:

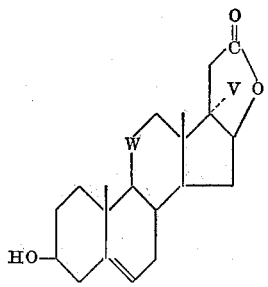

wherein V is selected from the group consisting of iodine, bromine and chlorine, and W is selected from the group consisting of methylene (>CH$_2$), β-hydroxymethylene

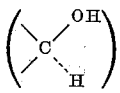

carbonyl (>C=O) and α-hydroxymethylene

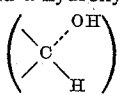

32. A compound selected from the group consisting of compounds of the following formulae:

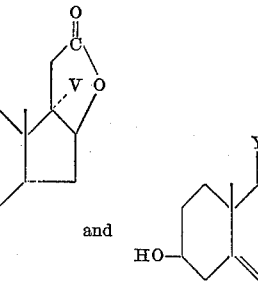

wherein V is selected from the group consisting of iodine, bromine and chlorine, and Y is selected from the group consisting of methylene (>CH$_2$), β-hydroxymethylene

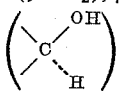

and carbonyl (>C=O).

33. 3,11 - diketo-16β-hydroxy-17α-iodopregna-1,4-dien-21-oic acid γ-lactone.

34. 3,11 - diketo-16β-hydroxy-17α-iodopregn-4-en-21-oic acid γ-lactone.

35. 3β,16β-dihydroxy - 11 - keto-17α-iodo-5α-pregnan-21-oic acid γ-lactone.

36. 3β,16β - dihydroxy-17α-iodopregn - 5(6)-en-21-oic acid γ-lactone.

37. Process for the production of 16β-hydroxy-21-carboxylic acid lactones which comprises:

(A) reacting a steroid of the pregnane series having in Ring D the structure

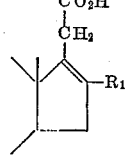

wherein $R_1$ is selected from the group consisting of hydrogen and methyl, with a halogen selected from the group consisting of iodine, bromine and chlorine in an alkaline aqueous medium to obtain a 17α-halolactone steroid of the pregnane series having in Ring D the structure

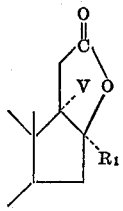

wherein V is selected from the group consisting of iodine, bromine and chlorine, and $R_1$ is defined as above,
(B) reacting the thus obtained 17α-halolactone with a dehydrohalogenating agent to obtain a 16α-hydroxy-21-carboxylic acid γ-lactone steroid of the pregnane series having in Ring D the structure

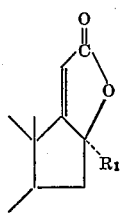

wherein $R_1$ is defined as above.
38. The process of claim 37 in which
(A) the halogen is iodine
(B) the dehydrohalogenating agent is pyridine.

39. Process for the production of 16β-hydroxy-21-carboxylic acid γ-lactones which comprises reacting a steroid of the pregnane series having in Ring D the structure

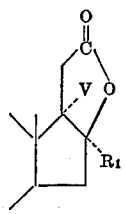

wherein $R_1$ is selected from the group consisting of hydrogen and methyl, and V is selected from the group consisting of iodine, bromine and chlorine, with a tertiary amine to obtain a steroid of the pregnane series having in Ring D the structure

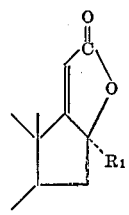

wherein $R_1$ is defined as above.
40. The process of claim 39 in which V is iodine and the tertiary amine is pyridine.

References Cited in the file of this patent
UNITED STATES PATENTS
3,045,012    Kurath et al. _____ July 17, 1962